United States Patent Office 3,714,159
Patented Jan. 30, 1973

3,714,159
2,2-DIARYL-4-(4'-ARYL-4'-HYDROXY-PIPER-
IDINO)-BUTYRAMIDES
Paul Adriaan Jan Janssen, Vosselaar, Carlos Jan Ernest
Josef Niemegeers, Deurne, and Raymond Antoine
Stokbroekx and Jan Vandenberk, Beerse, Belgium, assignors to Janssen Pharmaceutica, N.V.
No Drawing. Continuation-in-part of abandoned application Ser. No. 42,530, June 1, 1970. This application Mar. 30, 1971, Ser. No. 129,607
Int. Cl. C07d 87/46
U.S. Cl. 260—247.1                       18 Claims

ABSTRACT OF THE DISCLOSURE

Compounds of the class of 2,2-diaryl-4-(4'-aryl-4'-hydroxy-piperidino)butyramides wherein said aryl and said amide functions are variously defined groups, said butyramides having anti-diarrheal and analgesic actvities; also included are novel intermediates used in the synthesis of said butyramides.

CROSS-REFERENCE TO RELATED APPLICATION

This application is a continuation-in-part of our copending application Ser. No. 42,530 filed June 1, 1970, now abandoned.

BACKGROUND OF THE INVENTION

The invention pertains to the field of 2,2-diaryl-4-piperidinobutyramides as inhibitors of gastro-intestinal propulsion and as analgesics. The prior art discloses certain 2,2-diaryl - 4 - (4'-phenylpiperidino)butyronitriles as anti-diarrheals (see U.S. Pat. No. 2,898,340 and U.S. Pat. No. 3,539,579) among which is the well-known commerical product, 2,2-diphenyl-[(4-carbethoxy-4-phenyl) piperidino]butyronitrile, generically known as diphenoxylate. Other prior art compounds include, among others, various 2-2-diphenyl-4-piperidinobutyramides but not with hydroxy and aryl functions disubstituted in the 4-position of the piperidino ring as is found in the subject compounds. Such other compounds will be found in the followng references:

(1) "Synthetic Analgesics," by Dr. P. Janssen, Part I, esp. pages 33, 34 and 37–41, Pergamon Press, 1960;
(2) Cheney et al., J. Org. Chem., 17, 770 (1952);
(3) C. A., 33, 551³ (1944);
(4) Bockmühl et al., J.L. Ann. Chemie, 561, 52;
(5) C. A., 50, 4235ᵉ (1956);
(6) Ofner et al., J. Chem. Soc., 1950, 2158;
(7) Janssen et al., J. Am. Chem. Soc., 77, 4423 (1955); 78, 3862 (1956);
(8) Janssen et al., Arch. intern. Pharmacodyn, 103, 82 (1955); 107, 194 (1956);
(9) Janssen et al., J. Pharm. Pharmacol, 9, 381 (1957);
(10) Moffett et al., J. Am. Chem. Soc., 79, 4451 and 4462 (1957).

SUMMARY

An object of this invention is to provide a new class of 2,2-diaryl-4-piperidinobutyramides, in particular, those 2,2-diphenyl-(and halo-substituted diphenyl)-4-piperidinobutyramides which have both hydroxy and aryl substituents in the 4-position of the piperidine ring. Said butyramides may be used alone or in combination with other therapeutically active agents in controlling diarrhea and in analgesia.

DESCRIPTION OF THE PREFERRED EMBODIMENTS

The novel 2,2-diaryl-4-(4'-aryl-4'-hydroxypiperidino)-butyramides of this invention may be structurally represented by the following formulas:

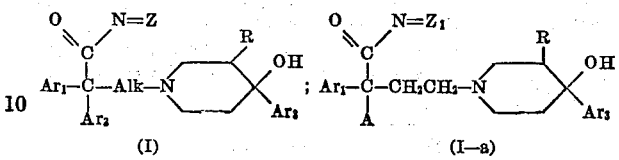

and

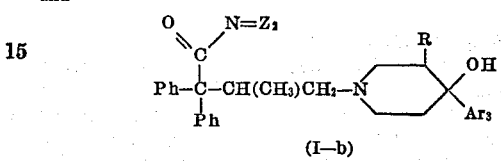

wherein
R is a member selected from the group consisting of hydrogen and methyl;
$Ar_1$ is a member selected from the group consisting of phenyl and halophenyl, preferably fluorophenyl;
$Ar_2$ is a member selected from the group consisting of phenyl and halophenyl, preferably fluorophenyl;
—Alk— is a member selected from the group consisting of —$CH_2CH_2$— and —$CH_2CH(CH_3)$—;
—N=Z is a member selected from the group consisting of

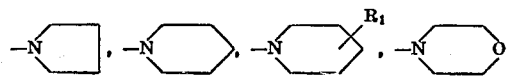

represent lower alkyl, preferably methyl, $R_3$ is a member selected from the group consisting of lower alkyl and benzyl, and $R_4$ is lower alkyl;
—N=$Z_1$ is a member selected from the group consisting of —$NH_2$ and —NH(lower alkyl);
—N=$Z_2$ is —N(lower alkyl)$_2$; and
$Ar_3$ is a member selected from the group consisting of phenyl and substituted phenyl;

provided that, when said —Alk— is —$CH_2CH(CH_3)$—, then said —N=Z is other than —$N(CH_2CH=CH_2)_2$.

The therapeutically active non-toxic acid addition salts of the foregoing compounds (I) are also embraced within the scope of this invention.

As used herein, "lower alkyl" and "lower alkoxy" may be straight or branch chained and have from 1 to about 6 carbon atoms, such as, for example, methyl, ethyl, propyl, isopropyl, butyl, pentyl, hexyl and the like alkyls, and, respectively, the corresponding alkoxys such as methoxy, ethoxy, propoxy, isopropoxy, etc. The term "halo" refers to halogens of atomic weight less than 127, i.e., fluoro, iodo, bromo and chloro. The term "substituted phenyl" means a phenyl group having one or more substituents thereon, such as lower alkyl, lower alkoxy, halo and trifluoromethyl. When more than one substituent is present, they may be the same or different. Typical substituted phenyls include mono-, di- and tri-halophenyl, trifluoromethylphenyl, halo-trifluoromethylphenyl, mono-, di- and tri-lower alkyl phenyl, and mono-, di- and tri-lower alkoxyphenyl. The term "butyramide" is used, other than in the examples and claims hereafter wherein it relates to specific compounds, in the broad sense to denote both butyramides (i.e., when the alkylene group between the α-carbon and the piperidino nitrogen is —CH₂CH₂—) and valeramides (i.e., when said alkylene group is —CH₂CH(CH₃)— or —CH(CH₃)CH₂—).

Among the preferred compounds herein are those wherein Ar₁ and Ar₂ are both the same; and particularly when both are phenyl, —Alk— is —CH₂CH₂—, and R is hydrogen, with —N=Z and Ar₃ being as previously described. When Ar₁ or Ar₂ is halophenyl, fluorophenyl is preferred, particularly p-fluorophenyl. When —Alk— is —CH₂CH(CH₃)—, the preferred compounds are those in which Ar₁ and Ar₂ are both phenyl, R is hydrogen and —N=Z is either

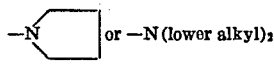

with Ar₃ being as previously described.

The compounds of Formulas I, I-a and I-b in which R represents a methyl group can obviously occur in stereochemical arrangements in which said methyl group is in a position cis or trans to the 4-hydroxy group. The nomenclature for those compounds has been simplified throughout this application by assigning the α-form conventionally to the isomer which separates first from the reaction mixture, whereas the β-form is assigned to the other isomer.

The organic bases of Formulas I, I-a and I-b may be converted to the corresponding pharmaceutically acceptable acid addition salts by reaction with an appropriate inorganic acid, such as, for example, hydrochloric, hydrobromic, hydriodic, sulfuric and the like acids, or with an appropriate organic acid, such as, for example, acetic, propionic, glycolic, lactic, oxalic, malonic, tartaric, citric, sulfamic, ascorbic and the like acids. In turn, the salts of Formulas I, I-a and I-b may be converted to the corresponding base form by conventional treatment with suitable alkali.

The compounds of Formula I are conveniently prepared by the condensation of an appropriate 3,3-diaryl-tetrahydro-2-furylidene-ammonium salt of Formula II, preferably the bromide salt, with an appropriate 4-aryl-4-piperidinol of Formula III which may be used in the form of its acid addition salt, such, as for example, a hydrohalide. The condensation reaction can be carried out in such organic solvents as the aromatic hydrocarbons, e.g., benzene, toluene, xylene and the like, lower alkanols, and lower alkanones, preferably 4-methyl-2-pentanone. Since during the condensation an equivalent of acid (HX) is liberated, it is desirable to use an appropriate amount of a suitable base, e.g., an alkali metal carbonate, to combine with the acid released. The presence of a catalytic amount of potassium iodide may be desirable. The reaction scheme may be illustrated as follows (wherein Ar₁, Ar₂, Ar₃, —N=Z, —Alk— and R are as heretofore described):

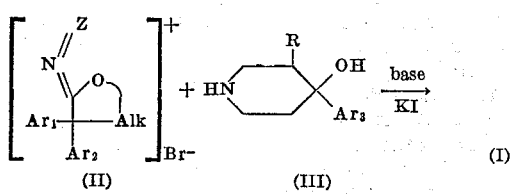

The compounds of Formula I-a are conveniently obtained by the condensation of an appropriate 4-halo-2,2-diarylbutyramide of Formula X, said halo preferably being chloro, with the piperidinols of Formula III:

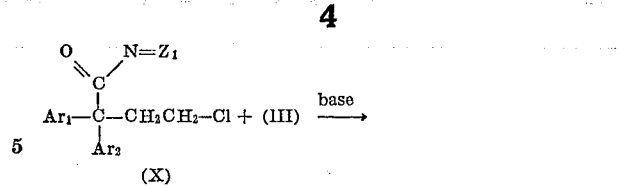

In like manner, the compounds of Formula I can be prepared by the condensation of an appropriate ω-halo-2,2-diarylbutyramide of Formula X-a with the piperidinols of Formula III:

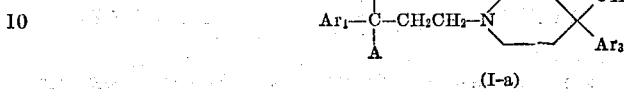

Such Formula X-a compounds are prepared by treating a quaternary salt of Formula II with suitable alkali, for example, a base such as an alkali metal or alkaline earth metal hydroxide, and thereby convert the quaternary salt into the carbinol of Formula X-b, the hydroxy function of which is transformed into a chloro function, e.g., by treatment with a chlorinating agent such as thionyl chloride, to thereby yield the desired compound of Formula X-a:

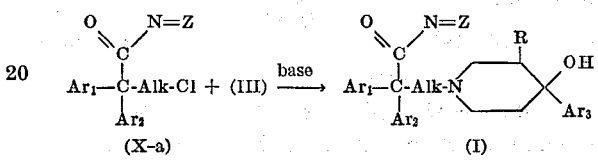

The compounds of Formula I-b may be prepared by the condensation of an appropriate 3,3-diphenyl-tetrahydro-2-furylidene ammonium salt of Formula XI, preferably the iodide salt, with the piperidinols of Formula III:

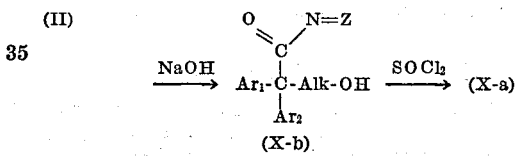

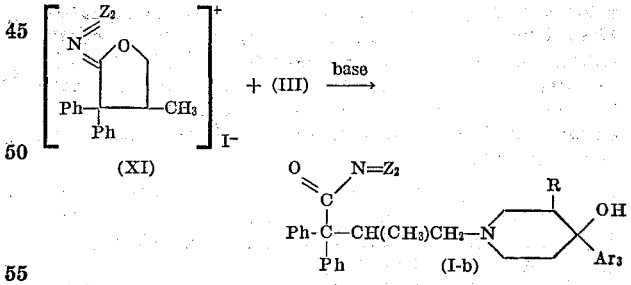

The Formula X butyramides are readily obtained by treating an appropriate 2-imino-3,3-diaryl-tetrahydrofuran of Formula XII with gaseous HCl in a suitable organic solvent, such as, for example, chloroform, diisopropyl ether, 4-methyl-2-pentanone and the like, at elevated temperatures, if desired, to enhance the rate of reaction.

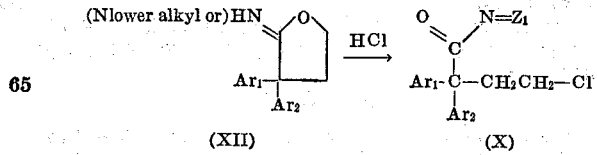

The tetrahydrofurans of Formula XII may be obtained by reacting an appropriate 4-bromo-2,2-diarylbutyryl chloride (XIII) with an appropriate (lower alkyl) amine or aqueous ammonia (HN=Z₁) and then neutralizing the thus-obtained hydrobromide salt of Formula XII-a to yield the free base (XII). Said butyryl chlorides (XIII) are readily obtained by conventional transformation of the corresponding 4-bromo-2,2-diarylbutyric acid (XIV), into the acid chloride form, for example, by treatment with thionyl chloride, oxalyl chloride and the like:

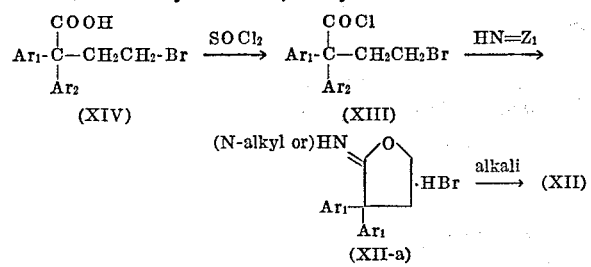

The Formula XI quaternary salts may be prepared according to the following reaction sequence. 3-cyano-3,3-diphenylisobutyric acid (XV) is reduced to its corresponding alcohol form (XVI). Such reduction may be accomplished by first transforming the acid (XV) into its corresponding acid chloride form (XV-a) using standard acid to acid chloride techniques, for example, by means of thionyl chloride or oxylyl chloride, and then treating the thus-obtained acid chloride with a suitable reducing agent, for example, sodium borohydride. Ring-closure of the alcohol (XVI) to yield the furanimine of Formula XVII is then accomplished by treatment with gaseous HCl in a suitable organic solvent, preferably in the cold. The thus-obtained furanimine (in the form of a HCl salt) is then converted to the corresponding quaternary salt of Formula XI by first treating said furanimine (XVII) with an alkali metal amide, for example, sodium or lithium amide, and then treating the thus-obtained alkali metal salt of (XVII) with excess lower alkyl iodide.

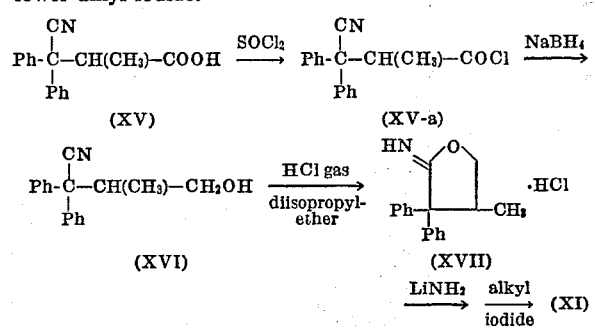

The starting immonium-ethers of Formula II, wherein —Alk— is —CH₂CH₂—, are conveniently prepared by the condensation of an appropriate acyl halide, preferably the chloride, of Formula VII with an amine of the formula: H—N=Z, wherein Ar₁, Ar₂ and —N=Z are as previously defined. The condensation reaction can be carried out in such organic solvents as an aromatic hydrocarbon, chloroform and the like, to which may be added water and an appropriate amount of a suitable base, e.g., an alkali metal carbonate, to combine with the acid released.

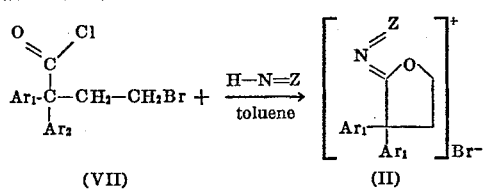

The Formula II immonium-ethers wherein —Alk— is —CH₂CH(CH₃)—, may be obtained by the condensation of an appropriate amide of Formula VIII with allyl bromide in the presence of a strong base such as sodium amide in an aromatic hydrocarbon solvent and then adding hydrogen bromide to the thus-obtained unsaturated amide of Formula IX to yield the corresponding Formula II immonium-ether.

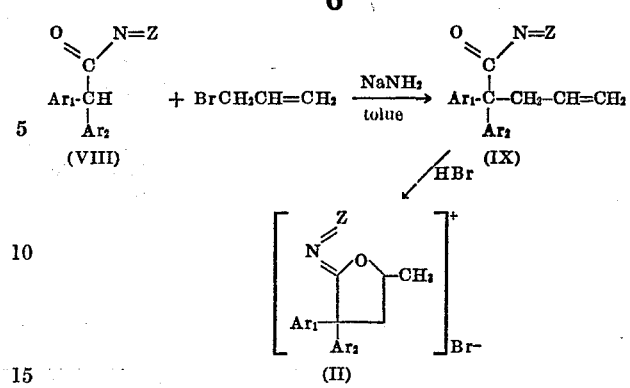

In view of the novelty of the 3,3-diaryl-tetrahydro-2-furylidene-ammonium quaternary salts of Formula II and of Formula XI and their utility as precursors for synthesizing the subject compounds, such quaternary salts comprise an additional feature of this invention.

Most of the 4-aryl-4-hydroxypiperidines of Formula III are known in the literature (for example, see U.S. Pat. No. 3,438,991). In general, they may be prepared by the condensation of an appropriate 1-(lower alkoxy) carbonyl-3-R-4-piperidone (IV), preferably wherein the lower alkoxy function is methoxy or ethoxy, with an appropriate phenyl-magnesium halide (V) under Grignard conditions. The protecting group in the 1-position of the thus-obtained 1-(lower alkoxy)carbonyl-3-R-Ar₃-4-hydroxypiperidine (VI) is then removed by heating the latter with a suitable alkali, e.g., potassium hydroxide to give the desired starting compound (III). The foregoing condensation reaction may be illustrated by the following reaction scheme:

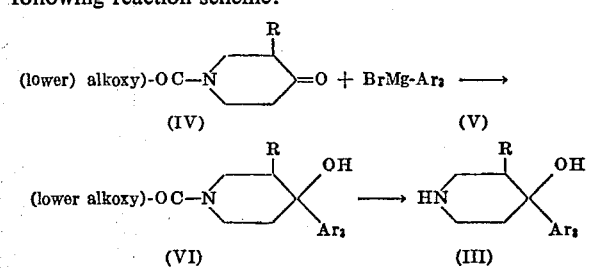

Alternatively, 1-benzyl-3-R-4-piperidone may be condensed with (V) and the thus-obtained 1-benzyl-3-R-4-Ar₃-4-hydroxypiperidine is then debenzylated, for example, by hydrogenation over platinum-on-charcoal, to give the desired starting compound (III).

The compounds of Formulas I, I–a and I–b, in base or salt form, are highly active inhibitors of gastro-intestinal propulsion and defecation and are therefore useful in the treatment of diarrhea. The anti-diarrheal activity of such compounds has been observed in experimental animals, for example, in rats according to the following test procedure. Young female Wistar rats (230–250 g. body weight) are fasted overnight and in the morning each animal is treated orally with a dose level of the compound to be tested. One hour thereafter, the animal receives 1 ml. of castor oil orally. Each animal is kept in an individual cage. At different time intervals (1, 2, 3, 4, 6 and 8 hrs.) after the castor oil treatment, the presence or absence of diarrhea is noted. In more than 95% of 500 control animals, severe diarrhea is observed 1 hour after treatment with castor oil. Using this all-or-none criterium, a significant positive effect occurs with the tested compound if no diarrhea is observed 1 hour after the castor oil treatment. The ED₅₀-value, i.e., the dose level at which such effect is observed in 50% of the animals, for the subject compounds generally ranges from about 0.01 to about 10 mg./kg. A minimum of 5-dose levels are used per drug, each dose level being given to 10 rats on ten different days.

In addition to anti-diarrheal activity, many of the subject compounds also possess analgesic activity, as demonstrated in the rat tail withdrawal test described in Arzneimittel-Forschung, 13, 502 (1963).

In the following tables, data relative to the anti-diarrheal and analgesic activities of several compounds are listed, it being understood that the compounds listed therein are not stated for purposes of limiting the invention thereto, but only to show the useful properties of all the compounds within the scope of the Formulas I, I-a and I-b.

$A = ED_{50}$ anti-diarrheal value (mg./kg., orally);
$B =$ Oral $ED_{50}$-value (mg./kg.) in rat tail withdrawal test;
$C =$ Ratio of $B/A =$ relative constipating specificity.

TABLE 1

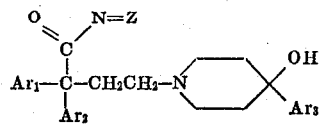

| $Ar_1$ | $Ar_2$ | —N=Z | $Ar_3$ | A | B | C |
|---|---|---|---|---|---|---|
| Ph | Ph | —N(Et)₂ | 3-CF₃-4-Cl-Ph | 0.1 | 20 | 200 |
| Ph | Ph | —N(Et)₂ | 4-F-Ph | 0.04 | 10 | 250 |
| Ph | Ph | —N(Et)₂ | 3,4-di-Cl-Ph | 0.40 | 80 | 200 |
| Ph | Ph | —N(Et)₂ | Ph | 0.03 | 3.0 | 100 |
| Ph | Ph | —N(Et)₂ | 3-CF₃-Ph | 0.02 | 2.0 | 100 |
| Ph | Ph | —N(Et)₂ | 4-Br-Ph | 0.32 | 32 | 100 |
| Ph | Ph | —(NEt)₂ | 4-Cl-Ph | 0.17 | 40 | 235 |
| Ph | Ph | —N⟨pyrrolidine⟩ | Ph | 0.02 | 7.0 | 350 |
| Ph | Ph | Same as above | 4-F-Ph | 0.16 | 40 | 250 |
| Ph | Ph | do | 3-CF₃-4-Cl-Ph | 0.43 | 160 | 372 |
| Ph | Ph | do | 3,4-di-Cl-Ph | 0.45 | >320 | >711 |
| Ph | Ph | do | 3-CF₃-Ph | 0.11 | 10 | 91 |
| Ph | Ph | do | 4-Cl-Ph | 0.25 | 160 | 640 |
| Ph | Ph | —N⟨piperidine⟩ | 3-CF₃-4-Cl-Ph | 5 | >160 | >32 |
| Ph | Ph | Same as above | 3,4-di-Cl-Ph | 2.5 | >160 | >64 |
| Ph | Ph | do | 3-CF₃-Ph | 0.55 | 160 | 290 |
| Ph | Ph | do | Ph | 0.25 | >320 | >1,280 |
| Ph | Ph | do | 4-Cl-Ph | 1.8 | >160 | >89 |
| Ph | Ph | —N⟨morpholine⟩ | 3-CF₃-Ph | 0.58 | >160 | >276 |
| Ph | Ph | Same as above | 3-CF₃-4-Cl-Ph | 1.0 | >160 | >160 |
| Ph | Ph | do | 3,4-di-Cl-Ph | 8.0 | >160 | >20 |
| Ph | Ph | do | Ph | 0.5 | 130 | 260 |
| Ph | Ph | do | 4-Cl-Ph | <10 | 160 | >16 |
| 4-F-Ph | 4-F-Ph | —N(Me)₂ | 4-Cl-Ph | 2.5 | >160 | >64 |
| Ph | Ph | —N(Me)₂ | 4-Cl-Ph | 0.13 | 80 | 615 |
| Ph | Ph | —N(Me)₂ | 4-Me-Ph | 1.3 | ≥160 | ≥123 |
| Ph | Ph | —N(Me)₂ | 3,4-di-Cl-Ph | 0.25 | 100 | 400 |
| Ph | Ph | —N(Me)₂ | 3-CF₃-4-Cl-Ph | 0.15 | 70 | 476 |
| Ph | Ph | —N(Me)₂ | Ph | 0.01 | 3.0 | 300 |
| Ph | Ph | —N(Me)₂ | 4-Br-Ph | 0.1 | 80 | 800 |
| Ph | Ph | —N(Me)₂ | 3-CF₃-Ph | 0.02 | 4.0 | 200 |
| Ph | Ph | —N(Me)₂ | 4-F-Ph | 0.05 | 20 | 400 |
| Ph | Ph | —N(Me)₂ | 2,4-di-Me-Ph | 0.15 | 20 | 133 |
| Ph | Ph | —N(Me)₂ | 3,4,5-tri-Me-Ph | 0.80 | >80 | >100 |
| Ph | Ph | —N(Me)₂ | 2,5-di-MeO-Ph | 0.63 | ≥160 | ≥254 |
| Ph | Ph | —N⟨2,6-diMe-morpholine⟩ | 4-Cl-Ph | <10 | ≥160 | ≥16 |
| Ph | Ph | —N⟨4-Me-piperidine⟩ | 4-Cl-Ph | <10 | >160 | >16 |
| Ph | Ph | —N(Me)(Et) | 4-Cl-Ph | 0.14 | ≥160 | ≥1,140 |
| Ph | Ph | —N(Me)⟨cyclohexyl⟩ | 4-Cl-Ph | <10 | >160 | >16 |
| Ph | Ph | —N(Me)(Bz) | 4-Cl-Ph | 1.2 | >160 | >133 |
| Ph | Ph | —N(allyl)₂ | 4-Cl-Ph | <10 | >160 | >16 |
| Ph | Ph | —N(Me)(n-Pr) | 4-Cl-Ph | 0.54 | >160 | >296 |
| Ph | Ph | —N(Me)(i-Pr) | 4-Cl-Ph | 0.54 | >160 | >269 |

TABLE 2

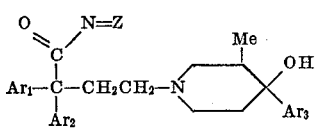

| Ar₁ | Ar₂ | —N=Z | Ar₃ | A | B | C |
|---|---|---|---|---|---|---|
| Ph | Ph | —N(Me)₂ | 3-CF₃-4-Cl-Ph | 0.37 | >160 | >432 |
| Ph | Ph | —N(Me)₂ | 3-CF₃-Ph | 0.03 | 25 | 833 |
| Ph | Ph | —N(Me)₂ | Ph | 0.07 | 40 | 571 |
| Ph | Ph | —N(Me)₂ | 4-Cl-Ph | 0.40 | >160 | >400 |

TABLE 3

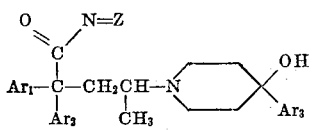

| Ar₁ | Ar₂ | —N=Z | Ar₃ | A | B | C |
|---|---|---|---|---|---|---|
| Ph | Ph | —N(Me)₂ | 4-Cl-Ph | 0.07 | 20 | 286 |
| Ph | Ph | —N(Me)₂ | 4-F-Ph | 0.03 | 20 | 667 |
| Ph | Ph | —N(Me)₂ | Ph | 0.06 | 20 | 333 |
| Ph | Ph | —N(Me)₂ | 3-CF₃-Ph | 0.02 | 2.5 | 125 |
| Ph | Ph | —N(Me)₂ | 3-CF₃-4-Cl-Ph | 0.06 | 2.5 | 42 |
| Ph | Ph | —N⟨ | Ph | 1.3 | >40 | >31 |
| Ph | Ph | Same | 4-Cl-Ph | 0.40 | 40 | 100 |
| Ph | Ph | ....do.... | 4-F-Ph | 1.1 | >40 | >36 |
| Ph | Ph | ....do.... | 3-CF₃-Ph | 2.0 | >80 | >40 |

TABLE 4

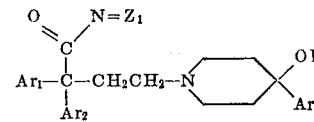

| Ar₁ | Ar₂ | —N=Z₁ | Ar₃ | A | B | C |
|---|---|---|---|---|---|---|
| Ph | Ph | —NHMe | 4-Cl-Ph | 1.00 | 40 | 129 |
| Ph | Ph | —NHMe | Ph | 0.16 | 5 | 31 |
| Ph | Ph | —NH₂ | 4-Cl-Ph | 5.00 | >40 | >8 |

TABLE 5

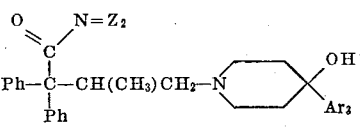

| —N=Z₂ | Ar₃ | A | B | C |
|---|---|---|---|---|
| —N(Me)₂ | 4-Cl-Ph | 0.03 | 1.0 | 33 |
| —N(Me)₂ | 3-CF₃-4-Cl-Ph | 0.04 | 1.25 | 31 |
| —N(Me)₂ | 3-CF₃-Ph | 0.01 | 1.25 | 125 |

TABLE 6

| | A | B | C |
|---|---|---|---|
| Known antidiarrheal: diphenoxylate | .15 | 6 | 40 |

In view of their useful anti-diarrheal and analgesic activities, the subject compounds and therapeutically useful acid addition salts thereof may be formulated in various pharmaceutical forms for administration purposes, e.g., liquids, powders, injectables, tablets, capsules and the like, according to conventional pharmaceutical techniques.

The following compounds, in base form, are representative of those embraced within the scope of this invention and which may be prepared by the procedures discussed herein:

4-(4-ethoxyphenyl)-N,N-diethyl-4-hydroxy-α,α-diphenyl-piperidine-1-butyramide;
4-[2,2-bis(p-chlorophenyl)-4-(4-hydroxy-4-p-tolylpiperidino)butyryl]morpholine;
1-{4-[4-(4-chloro-3-trifluoromethylphenyl)-4-hydroxy-piperidino]-2,2-bis-(p-fluorophenyl)butyryl}piperidine;
1-[2,2-bis(p-fluorophenyl)-4-(4-hydroxy-4-phenylpiperidino-valeryl]pyrrolidine;
N,N,-diallyl-4-(p-bromophenyl)-α,α-bis(p-fluorophenyl)-4-hydroxypiperidine-1-butyramide;
N-benzyl-α,α-bis(p-chlorophenyl)-4-(3,4-dichlorophenyl)-4-hydroxy-N-methylpiperidine-1-butyramide;
1-{2,2-bis(p-fluorophenyl)-4-[4-hydroxy-4-(p-methoxyphenyl)piperidino]-valeryl}piperidine;
4-{4-[4-(4-chloro-3-trifluoromethylphenyl)-4-hydroxy-piperidino]-2,2-bis-(p-fluorophenyl)butyryl}-2,6-dimethylmorpholine;
4-{4-[4-(p-chlorophenyl)-4-hydroxypiperidino]-2,2-diphenylvalery}morpholine;
1-{4-[4-hydroxy-4-(p-methoxyphenyl)piperidino]-2,2-diphenylvaleryl}piperidine;
4-hydroxy-4-(p-chlorophenyl)-α,α-diphenylpiperidine-1-butyramide;
4-hydroxy-4-(p-ethoxyphenyl)-α,α-diphenylpiperidine-1-butyramide;
1-{4-[4-(p-chlorophenyl)-4-hydroxypiperidino]-2-(p-fluorophenyl-2-phenylbutyryl}pyrrolidine;
N,N-diethyl-α-(p-fluorophenyl)-4-hydroxy-α-phenyl-4-p-tolylpiperidine-1-butyramide;
4-(p-chlorophenyl)-α-(p-fluorophenyl)-4-hydroxy-α-phenyl-N,N,γ-trimethylpiperidine-1-butyramide;
4-{4-[4-(4-chloro-3-trifluoromethylphenyl)-4-hydroxy-piperidino]-2-(p-fluorophenyl)-2-phenylbutyryl}morpholine;
α-(±)-N,N-diallyl-α,α-bis(p-fluorophenyl)-4-hydroxy-3-methyl-4-(3-trifluoromethylphenyl)piperidine-1-butyramide;
α-(±)-N-benzyl-4-hydroxy-N,3-dimethyl-4-(p-methyl-phenyl)-α,α-diphenylpiperidine-1-butyramide;
α-(±)-4-(p-chlorophenyl)-N,N-diethyl-α,α-bis(p-fluorophenyl)-4-hydroxy-3-methylpiperidine-1-butyramide; and
α(±)-4-[2,2-bis(p-fluorophenyl)-4-(4-hydroxy-3-methyl-4-phenyl)piperidino-butyryl]morpholine.

Due to the asymmetric carbons present in the subject compounds, it is evident that their existence in the form of stereochemical isomers (enatiomorphs) is possible. If desired, the resolution and isolation or the production of a particular form can be accomplished by application of general principles and techniques known in the art. Such pharmacologically active enantiomorphs are naturally intended to be included within the scope of this invention.

The following examples are intended to illustrate and not to limit the scope of the present invention. Unless otherwise stated, all parts are by weight.

EXAMPLE I 23.6 parts of 2-oxo-3,3-diphenyl-tetrahydrofuran are melted at 100° C. in an oil-bath and gaseous hydrogen bromide is introduced into it during 3 hours. The reaction mixture is cooled and triturated in benzene. The product is filtered off, washed with petroleumether and dried in an exsiccator, yielding 4 - bromo - 2,2-diphenylbutyric acid; M.P. 127.5° C.

To a stirred suspension of 16 parts of 4-bromo-2,2-di-phenylbutyric acid in 150 parts of chloroform are added dropwise 16 parts of thionyl chloride and the whole is stirred and refluxed for 2 hours. The reaction mixture is evaporated, yielding 4-bromo-2,2-diphenylbutyrylchloride as a residue.

15 parts of 4-bromo-2,2-diphenylbutyrylchloride are dissolved in 40 parts of benzene. This solution is added dropwise to a suspension of 7.1 parts of pyrrolidine in 40 parts of benzene while cooling (room temperature). Upon completion, stirring is continued for 2 hours. The reaction mixture is evaporated. The residue is taken up in water and the product is extracted with chloroform. The extract is dried and evaporated. The residue is crystallized from 4 - methyl - 2 - pentanone, yielding 1-(tetrahydro-3,3-diphenyl-2-furylidene)pyrrolidinium bromide; M.P. 185.4–188.8° C.

EXAMPLE II

To a stirred solution of 32 parts of 4-bromo-2,2-diphenylbutyrylchloride in 160 parts of benzene are added dropwise 20 parts of piperidine at room temperature. Upon completion, stirring is continued overnight. The reaction mixture is filtered. The filtrate is washed with water, dried and evaporated. The residue is crystallized from 4-methyl-2-pentanone, yielding 1-(tetrahydro-3,3-diphenyl-2-furylidene)piperidinium bromide; M.P. 118.2–121.2° C.

EXAMPLE III

To a stirred and cooled solution of 30 parts of 4-bromo-2,2-diphenylbutyrylchloride in 80 parts of toluene are added dropwise 16.5 parts of morpholine at 0° C. Upon completion, stirring is continued overnight. The precipitated product is filtered off (filtrate is set aside) and suspended in water. The undissolved part is filtered off again, dried and recrystallized from 4-methyl-2-pentanone, yielding a first fraction of about 9 parts of 4-(tetrahydro-3,3-diphenyl-2-furylidene)morpholinium bromide; M.P. 174° C. The organic phase of the mother-liquor (filtrate which was set aside) is washed with water, dried and evaporated. The residue is crystallized from 4-methyl-2-pentanone, yielding a second fraction of about 2 parts of 4-(tetrahydro - 3,3 - diphenyl-2-furylidene)morpholinium bromide; M.P. 175.7–178.9° C.

EXAMPLE IV 60 parts of 4-bromo-2,2-diphenylbutyrylchloride are dissolved in 400 parts of toluene and gaseous dimethylamine is introduced slowly into the solution while cooling (temperature is kept at about 0° C). The introduction is ceased when dimethylamine escapes from the cooler, and stirring is continued for 2 hours at ordinary temperature. The precipitated product is filtered off and dissolved in a minimum quantity of water. The product is extracted with chloroform. The extract is dried and evaporated. The residue solidifies on triturating in 4-methyl-2-pentanone. The solid is filtered off and dried, yielding dimethyl (tetrahydro - 3,3 - diphenyl-2-furylidene)ammonium bromide; M.P. 169–171.5° C.

EXAMPLE V

A suspension of 325 parts of 4-bromo-2,2-diphenylbutyrylchloride in 1440 parts of toluene is stirred in an ice-bath and while maintaining the temperature between 0° C. and −5° C., there are added dropwise 146.3 parts of diethylamine dissolved in 160 parts of toluene. Upon completion, stirring is continued for 2 hours. The precipitated product is filtered off and dried. A sample of 20 parts is dissolved in water and extracted with chloroform. The extract is dried and evaporated. The oily residue is crystallized from diisopropylether. The solid product is filtered off and recrystallized from 4-methyl-2-pentanone, yielding diethyl (tetrahydro - 3,3-diphenyl-2-furylidene) ammonium bromide; M.P. 171.8–177.8° C.

EXAMPLE VI

A mixture of 27 parts of N,N-dimethyl-2,2-diphenylacetamide, 9 parts of sodium amide 50% and 120 parts of toluene is stirred and refluxed for 3 hours. After cooling, there are added 15 parts of allyl bromide and the whole is heated again to reflux temperature. After stirring at this temperature for 3 hours, the reaction mixture is cooled, washed with water, dried and evaporated. The oily residue solidifies on standing at room temperature for 2 days. The solid product is triturated in diisopropylether, filtered off again, and dried, yielding N,N-dimethyl-2,2-diphenyl-4-pentenamide; M.P. 110.9° C.

12 parts of N,N-dimethyl-2,2-diphenyl-4-pentenamide are dissolved in 60 parts of glacial acetic acid and gaseous hydrogen bromide is introduced into the solution during 30 minutes. The reaction mixture is evaporated and the residue is dissolved in water. The solution is filtered and the product is extracted with chloroform. The extract is dried, filtered and evaporated. The oily residue is crystallized from 4-methyl-2-pentanone, yielding dimethyl (tetrahydro-5-methyl-3,3-diphenyl-2 - furylidene)ammonium bromide; M.P. 207.1° C.

EXAMPLE VII 45 parts of sodium amide suspension 50% are suspended in 600 parts of toluene and at a temperature between 50° and 60° C., there are added 132.5 parts of 1-(2,2-diphenylacetyl)pyrrolidine. The whole is stirred for 3 hours at 80° C. The mixture is cooled to room temperature and there are added dropwise 75 parts of allyl bromide. Upon completion, the whole is heated to 80–90° C. and stirred at this temperature for 3 hours. The reaction mixture is cooled, washed with water, dried and evaporated. The residue is crystallized from diisopropylether, yielding 1-(2,2-diphenyl-4-pentenoyl)pyrrolidine; M.P. 95.3° C.

A solution of 55 parts of 1-(2,2-diphenyl-4-pentenoyl) pyrrolidine in 100 parts of glacial acetic acid is stirred while gaseous hydrogen bromide is introduced into it till saturation (about 2 hours): temperature rises to about 60° C. The reaction mixture is evaporated and the residue is crystallized from 4-methyl-2-pentanone, yielding 1-tetrahydro-5-methyl-3,3-diphenyl - 2 - furylidene)pyrrolidinium bromide; M.P. 226.2° C.

EXAMPLE VIII

To a stirred and cooled solution of 42.9 parts of 4-bromo-2,2-diphenylbutyrylchloride in 240 parts of toluene are added dropwise 26.1 parts of dipropylamine while keeping the temperature between 0° and 5° C. Upon completion, stirring is continued for one hour. The formed precipitate is filtered off and there is added chloroform and a small quantity of water. The whole is vigorously stirred and the chloroform layer is separated, dried and evaporated. The oily residue is crystallized from 4-methyl-2-pentanone, yielding dipropyl (tetrahydro-3,3-diphenyl-2-furylidene)ammonium bromide; M.P. 165.5–167.6° C.

EXAMPLE IX

To a stirred and cooled mixture of 43.55 parts of 4-bromo-2,2-diphenylbutyrylchloride in 200 parts of toluene are added dropwise 33.3 parts of N,N-dibutylamine at a temperature between 0° and 5° C. Upon completion, stirring is continued for one hour. The reaction mixture is allowed to stand overnight and water is added. The toluene phase is separated, washed twice with water, dried and evaporated. The residue is taken up in diisopropylether and the solvent is evaporated again, yielding dibutyl (tetrahydro-3,3-diphenyl - 2 - furylidene)ammonium bromide as an oil.

EXAMPLE X

To a stirred mixture of 50.6 parts of 4-bromo-2,2-diphenylbutyrylchloride, 17.5 parts of triethylamine in 320 parts of toluene are added dropwise 17.3 parts of 2,6-dimethylmorpholine (exothermic reaction: temperature rises to 50° C.). Upon completion, stirring is continued for 30 minutes at room temperature. The reaction mixture is filtered and the filtrate is washed successsively with water, hydrochloric acid solution and water. The toluene phase is dried and evaporated. The oily residue is dissolved in diisopropylether and stirred overnight. The precipitated product is filtered off and dried, yielding 2,6-dimethyl-4-(tetrahydro-3,3-diphenyl - 2 - furylidene) morpholinium bromide; M.P. 143.4–144.5° C.

EXAMPLE XI

To a stirred and cooled mixture of 11 parts of 4-methylpiperidine, 10.6 parts of sodium carbonate and 150 parts of chloroform is added dropwise a solution of 33.8 parts of 4-bromo-2,2-diphenylbutyrylchloride in 100 parts of water at a temperature between 0° and 5° C. Upon completion, stirring is continued for 1.5 hrs. The layers are separated and the aqueous phase is extracted twice with chloroform. The combined organic layers are dried and evaporated. The residue is dissolved in warm 4-methyl-2-pentanone. After cooling while stirring, the product is crystallized. It is filtered off and dried in vacuo, yielding 4-methyl-1-(tetrahydro-3,3-diphenyl-2 - furylidene)piperidinium bromide; M.P. 192.7–194.8° C.

EXAMPLE XII

To a stirred and cooled mixture of 14.7 parts of N-ethyl-N-methylamine hydrochloride, 23.3 parts of sodium carbonate, and 100 parts of water is added dropwise a solution of 33.8 parts of 4-bromo-2,2-diphenylbutyrylchloride in 80 parts of toluene at a temperature between 0° and 5° C. Upon completion, stirring is continued for 30 minutes. The layers are separated and the aqueous phase is extracted with chloroform. The combined organic layers are dried, filtered and evaporated. The residue is crystallized from acetone, yielding ethylmethyl (tetrahydro-3,3-diphenyl - 2 - furylidene)ammonium bromide; M.P. 172.1–173° C.

EXAMPLE XIII

To a stirred and cooled solution of 9.9 parts of 3-methylpiperidine, 10.6 parts of sodium carbonate in 100 parts of water is added dropwise a solution of 33.7 parts of 4-bromo-2,2-diphenylbutyrylchloride in 80 parts of toluene while keeping the temperature between 0° and 5° C. Upon completion, the ice-bath is removed and the whole is stirred for one hour at room temperature. The supernatant toluene phase is decanted and the oily layer together with the water-phase is extracted with chloroform. The extract is dried and evaporated. The oily residue solidifies on stirring in 200 parts of 4-methyl-2-pentanone. The solid product is filtered off and dried, yielding 3 - methyl-1-(tetrahydro-3,3-diphenyl-2-furylidene)piperidinium bromide; M.P. 197.8–199° C.

EXAMPLE XIV

To a stirred and cooled mixture of 43.55 parts of 4-bromo-2,2-diphenylbutyrylchloride in 240 parts of toluene are added dropwise 31.3 parts of N-benzyl-N-methylamine at a temperature between 0° and 5° C. Upon completion, the cooling-bath is removed and the mixture is allowed to stand overnight at room temperature. Water is added and the toluene phase is separated. The latter is washed twice with water, dried and evaporated. The residue is crystallized from diisopropylether and a small quantity of 4-methyl-2-pentanone. The solid product is filtered off, and dried, yielding benzylmethyl (tetrahydro-3,3-diphenyl - 2 - furylidene)ammonium bromide; M.P. 111.8–113.6° C.

EXAMPLE XV

To a stirred and cooled (ice-bath) solution of 43.5 parts of 4-bromo-2,2-diphenylbutyrylchloride in 200 parts of toluene are added dropwise 25.1 parts of N,N-diallylamine at a temperature between 0° and 5° C. Upon completion, stirring is continued for 24 hours. The reaction mixture is filtered from some starting material and the filtrate is washed twice with water, dried and evaporated. The oily residue is dissolved in 320 parts of diisopropylether. The solution is stirred overnight while the solvent is evaporated without heating. The precipitated product is filtered off and dried, yielding diallyl (tetrahydro-3,3-diphenyl - 2 - furylidene)ammonium bromide; M.P. 97.5–100.1° C.

EXAMPLE XVI

To a stirred and cooled (ice-bath) mixture of 22 parts of N-methyl-N-propylamine hydrochloride, 31.8 parts of sodium carbonate and 200 parts of water is added dropwise a solution of 67.5 parts of 4-bromo-2,2-diphenylbutyryl chloride in 160 parts of toluene at 0° C. Upon completion, stirring is continued for one hour at room temperature. The aqueous phase is separated and extracted with chloroform. The combined organic phases are dried and evaporated. The residue is dissolved in 4-methyl-2-pentanone. The solution is filtered and after cooling the filtrate to room temperature, the product is crystallized. It is filtered off and dried, yielding methylpropyl (tetrahydro-3,3-diphenyl-2-furylidene)ammonium bromide; M.P. 170.2–171.8° C.

EXAMPLE XVII

To a stirred and cooled (ice-bath) solution of 10.9 parts of N-isopropyl-N-methylamine hydrochloride, 21.2 parts of sodium carbonate and 100 parts of water is added dropwise a solution of 33.8 parts of 4-bromo-2,2-diphenylbutyrylchloride in 80 parts of toluene at 0° C. Upon completion, stirring is continued for one hour. The aqueous phase is separated and extracted with chloroform. The combined organic layers are dried, filtered and evaporated, yielding methylisopropyl (tetrahydro - 3,3 - diphenyl - 2-furylidene)ammonium bromide as a residue.

EXAMPLE XVII (A) A mixture of 11.16 parts of 1-(tetrahydro-3,3-diphenyl-2-furylidene)pyrrolidinium bromide, 6.33 parts of 4-(p-chlorophenyl)-4-piperidinol, 8 parts of sodium carbonate, 0.2 part of potassium iodide and 240 parts of 4-methyl-2-pentanone is stirred and refluxed for 39 hours with water-separator. Then a second portion of 1 part 1-(tetrahydro-3,3-diphenyl - 2 - furylidene)pyrrolidinium bromide is added and stirring at reflux temperature is continued for another 6 hours (water-separator). The reaction mixture is filtered hot and the filtrate is evaporated. The residue is dissolved in chloroform. The solution is washed with water, dried and evaporated. The residue is triturated in 4-methyl-2-pentanone. The precipitated product is filtered off, washed successively with 4-methyl-2-pentanone and petroleumether, and dried, yelding 1-{4-[4 - (p - chlorophenyl) - 4 - hydroxypiperidino] - 2,2 - diphenylbutyryl}pyrrolidine; M.P. 168.6° C.

(B) Utilizing the preparative method of Example XVIII-A, the following related compounds can be prepared, starting with an equivalent amount of the appropriate pyrrolidinium precursor of Formula II:

1-{4-[4-(p-chlorophenyl)-4-hydroxypiperidino]-2,2-bis(p-fluorophenyl)butyryl}pyrrolidine;
1-{4-[4-(p-chlorophenyl)-4-hydroxypiperidino]-2,2-bis(p-fluorophenyl)valeryl}pyrrolidine; and
1-{4-[4-(p-chlorophenyl)-4-hydroxypiperidino]-2-(p-fluorophenyl)-2-phenylbutyryl}pyrrolidine.

EXAMPLE XIX

A mixture of 6.33 parts of 4-(p-chlorophenyl)-4-piperidinol, 8 parts of sodium carbonate, 0.2 part of potassium iodide and 240 parts of 4-methyl-2-pentanone is distilled azeotropically. Then there are added 13.58 parts of 4-(tetrahydro-3,3-diphenyl - 2 - furylidene)morpholinium bromide and the whole is stirred and refluxed for 15 hours. The reaction mixture is filtered hot and the filtrate is evaporated. The residue is dissolved in toluene and diisopropylether. The solution is evaporated again. The residue is dissolved in acetone and acidified with an excess of 2-propanol previously saturated with gaseous hydrogen chloride. Upon the addition of diisopropylether, the salt is crystallized. It is filtered off, washed with acetone and dried, yielding 4-{4-[4-(p-chlorophenyl)-4-hydroxypiperidino]-2,2-diphenylbutyryl}morpholine hydrochloride; M.P. 257.5° C.

EXAMPLE XX

A mixture of 6.33 parts of 4-(p-chlorophenyl)-4-piperidinol, 8 parts of sodium carbonate, 0.2 part of potassium iodide and 240 parts of 4-methyl-2-pentanone is distilled azeotropically. Then there are added 12.12 parts of dimethyl (tetrahydro - 3,3 - diphenyl-2-furylideneammonium bromide and the whole is stirred and refluxed for about 15 hours. The reaction mixture is filtered hot and the filtrate is evaporated. The oily residue is dissolved in 2-propanol and to this solution is added an excess of 2-propanol previously saturated with gaseous hydrogen chloride. The whole is evaporated and the oily residue is warmed in diluted hydrochloric acid solution. Upon the addition of toluene, the salt is precipitated. It is filtered off, boiled in acetone, and filtered off again after cooling, yielding 4-(p-chlorophenyl)-4-hydroxy-N,N-dimethyl-α,α-diphenylpiperidine - 1 - butyramide hydrochloride; M.P. 222.1° C.

EXAMPLE XXI

A mixture of 6.33 parts of 4-(p-chlorophenyl)-4-piperidinol, 8 parts of sodium carbonate, 0.2 part of potassium iodide and 240 parts of 4-methyl-2-pentanone is distilled azeotropically. Then there are added 13.45 parts of 1-(tetrahydro-3,3-diphenyl - 2 - furylidene)piperidinium bromide and the whole is stirred and refluxed with water-separator for 24 hours. The reaction mixture is filtered hot and the filtrate is evaporated. The residue is triturated in diisopropylether, filtered off again, washed with the same solvent and dried, yielding 12 parts of the crude base, 1-{4-[4-(p-chlorophenyl) - 4 - hydroxypiperidino]-2,2 - diphenylbutyryl}piperidine, which is dissolved in chloroform. The solution is shaken with water, dried and evaporated. The residue is dissolved in acetone and diisopropylether is added. The crystallized product is filtered off and converted into its hydrochloride salt by treatment with excess 2-propanol previously saturated with hydrogen chloride. The crude salt is filtered off, dried for 20 hours at 60° C. and after recrystallization from ethanol, pure 1-{4-[4-(p-chlorophenyl) - 4 - hydroxypiperidino]-2,2-diphenylbutyryl}piperidine hydrochloride is obtained; M.P. 251.1° C.

EXAMPLE XXII

A mixture of 13.5 parts of 1-(tetrahydro-3,3-diphenyl-2-furylidene) piperidinium bromide, 5.75 parts of 4-p-tolyl-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water is added. The organic layers is separated, dried and evaporated. The oily residue is dissolved in 160 parts of acetone and the solution is acidified with an excess of 2-propanol previously saturated with gaseous hydrogen chloride. The precipitated solid salt is filtered off and dried in vacuo, yielding about 13 parts of 1-[4-(4-hydroxy-4-p-tolylpiperidino) - 2,2 - diphenylbutyryl]piperidine hydrochloride hemihydrate; M.P. 240° C.

EXAMPLE XXIII

A mixture of 11.6 parts of 1-(tetrahydro-3,3-diphenyl-2 - furylidene)piperidinium bromide, 7 parts of 4 - (4-chloro-3-trifluoromethylphenyl) - 4 - piperidino, 8 parts of sodium carbonate, 0.2 part of potassium iodide and 200 parts of 4-methyl - 2 - pentanone is stirred and refluxed with water-separator for 3 hours. The reaction mixture is cooled and 200 parts of water is added. The organic layer is separated, dried and evaporated. The residue is dissolved in diisopropylether. The solution is filtered and filtrate is acidified with an excess of 2-propanol previously saturated with gaseous hydrogen chloride, whereupon a sticky salt is precipitated. The solvent is decanted and the residue is stirred in 4-methyl-2-pentanone. Upon the addition of diisopropylether, an oily product is separated, which solidifies after stirring overnight. The solid is filtered off and dried, yielding about 10 parts of 1-{4-[4-(4-chloro - 3 - trifluoromethylphenyl - 4 - hydroxypiperidino] - 2,2 - diphenylbutyryl}piperidine hydrochloride; M.P. 204.4° C.

EXAMPLE XXIV (A) A mixture of 5.75 parts of dimethyl (tetrahydro-3,3-diphenyl-2-furylidene)ammonium bromide, 12.1 parts of 4-p-tolyl-4-piperidine, 8 parts of sodium carbonate, 0.2 part of potassium iodide and 200 parts of 4-methyl-2-pentanone is stirred and refluxed with water-separator for 3 hours. The reaction mixture is cooled and 200 parts of water is added. The organic layer is separated, dried and evaporated. The oily free base is converted into its hydrochloride salt in the conventional manner, yielding 4 - hydroxy-N,N-dimethyl-4-p-tolyl - α,α - diphenylpiperidine-1-butyrylamide hydrochloride; M.P. 206.6° C.

(B) The procedure of Example XXIV–A is followed, except that an equivalent amount of the appropriate immonium ether precursor of Formula II is used, to yield the following compounds:

α,α-bis(p-fluorophenyl)-4-hydroxy-N,N-dimethyl-4-p-tolylpiperidine-1-butyramide hydrochloride; and
α,α-bis(p-fluorophenyl)-4-hydroxy-N,N-γ-trimethyl-4-p-tolylpiperidine-1-butyramide hydrochloride.

EXAMPLE XXV (A) A mixture of 11.6 parts of 1-(tetrahydro-3,3-diphenyl-2-furylidene) piperidinium bromide, 6.2 parts of 4-(3,4-dichlorophenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water is added. The organic layer is separated, dried and evaporated. The oily base residue is converted into its hydrochloride salt in the conventional manner, yielding 1-{4-[4-(3,4-dichlorophenyl)-4-hydroxypiperidino]-2,2--diphenylbutyryl}piperidine hydrochloride; M.P. 202.5° C.

(B) Repeating the procedure of Example XXV–A with an equivalent amount of an appropriate piperidinium precursor of Formula II, the following compounds can be prepared:

1-{4-[4-(3,4-dichlorophenyl)-4-hydroxypiperidino]-2,2-bis(p-fluorophenylbutyryl}piperidine hydrochloride; and
1-{4-[4-(3,4-dichlorophenyl)-4-hydroxypiperidino]-2-(p-fluorophenyl)-2-phenylvaleryl}piperidine hydrochloride.

EXAMPLE XXVI (A) A mixture of 13.6 parts of 4-(tetrahydro-3,3-diphenyl-2-furylidene) morpholinium bromide, 7.4 parts of 4-(3-trifluoromethylphenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water is added. The organic layer is separated, dried and evaporated. The oily base residue is converted into the hydrochloride salt in the conventional manner, yielding about 11 parts of 4-{4-[4-hydroxy-4-(3-trifluoromethylphenyl)piperidino] - 2,2 - diphenylbutyryl}morpholine hydrochloride; M.P. 213.6° C.

(B) Utilizing the preparative method of Example XXVI–A, the following related compounds can be prepared, starting with an equivalent amount of the appropriate morpholinium precursor of Formula II:

4-{[2,2-bis(p-fluorophenyl)]-4-[4-hydroxy-4-(3-trifluoromethylphenyl)-piperidino]butyryl}morpholine hydrochloride;
4-{[2,2-bis(p-fluorophenyl)]-4-[4-hydroxy-4-(3-trifluoromethylphenyl)-piperidino]valeryl}morpholine hydrochloride;
4-{[2-(p-fluorophenyl)-2-phenyl]-4-[4-hydroxy-4-(3-trifluoromethylphenyl)-piperidino]butyryl}morpholine hydrochloride; and
4-{[2-(p-fluorophenyl)-2-phenyl]-4-[4-hydroxy-4-(3-trifluoromethylphenyl)-piperidino]valeryl}morpholine hydrochloride.

EXAMPLE XXVII (A) A mixture of 13.5 parts of 1-(tetrahydro-3,3-diphenyl-2-furylidene) piperidinium bromide, 7.4 parts of 4-(3-trifluoromethylphenyl)-4-piperidinol, 8 parts of sodium carbonate, 0.2 part of potassium iodide and 200 parts of 4-methyl-2-pentanone is stirred and refluxed for 3 hours with water separator. The reaction mixture is cooled and water is added. The organic layer is separated, dried and evaporated. The oily residue is dissolved in diisopropylether. The solution is filtered and the filtrate is acidified with an excess of 2-propanol previously saturated with gaseous hydrogen chloride. The sticky salt is filtered off and dissolved in 160 parts of 4-methyl-2-pentanone. The solution is stirred at room temperature, whereupon the product is precipitated again, yielding about 11 parts of 1-{4-[4-hydroxy-4-(3-trifluoromethylphenyl)piperidino] - 2,2 - diphenylbutyryl}piperidine hydrochloride; M.P. 200° C.

(B) According to the procedure outlined in Example XXVII-A, except that equivalent quantities of the appropriate Formula II and Formula III starting materials are employed, there can be prepared:

1-{4-[4-(p-fluorophenyl)-4-hydroxypiperidino]-
  2,2-diphenylvaleryl}-piperidine hydrochloride; and
1-{4-[4-hydroxy-4-(p-methoxyphenyl)piperidino]-
  2,2-diphenylvaleryl}-piperidine hydrochloride.

EXAMPLE XXVIII

A mixture of 11.2 parts of diethyl (tetrahydro-3,3-diphenyl-2-furylidene)ammonium bromide, 7 parts of 4-(4-chloro-3-trifluoromethylphenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and water is added. The organic layer is separated, washed with diluted sodium hydroxide solution, dried and concentrated to a volume of 150 parts. The concentrate is acidified with an excess of 2-propanol previously saturated with gaseous hydrogen chloride. The precipitated solid salt is filtered off and dried, yielding 4-(4-chloro-3-trifluoromethylphenyl) - N,N - diethyl-4-hydroxy-α,α-diphenylpiperidine-1-butyramide hydrochloride; M.P. 220.7° C.

EXAMPLE XXIX

A mixture of 13.5 parts of 1-(tetrahydro-3,3-diphenyl-2-furylidene) piperidinium bromide, 5.3 parts of 4-phenyl-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water is added. The organic layer is separated, dried and evaporated. The solid residue is crystallized from 120 parts of 4-methyl-2-pentanone (activated charcoal), yielding 7.8 parts of the crude free base of 1-[4-(4-hydroxy-4-phenylpiperidino)-2,2-diphenylbutyryl]piperidine hydrochloride. It is dissolved in 4-methyl-2-pentanone and this solution is acidified with an excess of 2-propanol previously saturated with gaseous hydrogen chloride. The precipitated salt is filtered off and dried, yielding 1-[4-(4-hydroxy-4-phenylpiperidino) - 2,2-diphenylbutyryl]piperidine hydrochloride; M.P. 240.3° C.

EXAMPLE XXX

A mixture of 13.6 parts of 4-(tetrahydro-3,3-diphenyl-2-furylidene)-morpholinium bromide, 5.75 parts of 4-p-tolyl-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water are added. The organic layer is separated, dried and evaporated. The oily residue is dissolved in 120 parts of 4-methyl-2-pentanone and the solution is acidified with an excess of 2-propanol previously saturated with gaseous hydrogen chloride. The precipitated solid salt is filtered off and dried in vacuo, yielding about 11.2 parts of 4-[4-(4-hydroxy - 4 - p-tolylpiperidino)-2,2-diphenylbutyryl]morpholine hydrochloride; M.P. 240° C.

EXAMPLE XXXI

A mixture of 9.7 parts of 4-(tetrahydro-3,3-diphenyl-2-furylidene)morpholinium bromide, 7 parts of 4-(4-chloro - 3-trifluoromethylphenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and water is added. The organic layer is separated, washed with diluted sodium hydroxide solution, dried and evaporated. The oily free base is converted into its hydrochloride salt and dried, yielding 4-{4-[4-(4-chloro-3-trifluoromethylphenyl)-4-hydroxy piperidino]-2, 2 - diphenylbutyryl}morpholine hydrochloride; M.P. 243.1° C.

EXAMPLE XXXII

A mixture of 6.33 parts of 4-(p-chlorophenyl)-4-piperidinol, 8 parts of sodium carbonate, 0.2 part of potassium iodide and 240 parts of 4-methyl-2-pentanone is dried azeotropically. After cooling to about 80° C., there are added 14.5 parts of dimethyl (tetrahydro-5-methyl-3,3-diphenyl-2-furylidene) ammonium bromide and the whole is stirred overnight at reflux temperature. Then a second portion of 3 parts of dimethyl (tetrahydro-5-methyl-3,3-diphenyl-2-furylidene) ammonium bromide is added and stirring at reflux is continued for another 4 hours. The reaction mixture is filtered hot and after cooling the filtrate to room temperature, the product is precipitated. It is filtered off, dried and crystallized from ethanol, yielding about 4.4 parts of 4-(p-chlorophenyl)-4-hydroxy-N, Nγ - trimethyl-α,α-diphenylpiperidine-1-butyramide; M.P. 200.8° C.

EXAMPLE XXXIII (A) A mixture of 10.9 parts of 4-(tetrahydro-3,3-diphenyl-2-furylidene)morpholinium bromide, 6.2 parts of 4 - (3,4-dichlorophenyl)-4-piperidinol, 8 parts of sodium carbonate, 0.2 part of potassium iodide and 200 parts of 4-methyl-2-pentanone is stirred and refluxed with water-separator for 5 hours. The reaction mixture is cooled and water (200 parts) is added. The organic layer is separated, dried and evaporated to a volume of about 200 parts. The concentrate is acidified with an excess of 2-propanol previously saturated with gaseous hydrogen chloride. The crystallized salt is filtered off and dried, yielding 4-{4-[4-(3,4-dichlorophenyl) - 4 - hydroxypiperidino] - 2,2-diphenylbutyryl}morpholine hydrochloride; M.P. 242.8° C.

(B) The process of Example XXXIII-A is repeated using equivalent quantities of the appropriate starting materials of Formula II and Formula III to prepare the following compounds:

4-{4-[4-hydroxy-4-(3-trifluoromethylphenyl)piperidino]-
  2,2-diphenylvaleryl morpholine hydrochloride; and
4-[4-(4-hydroxy-4-phenylpiperidino)-2,2-diphenyl-
  valeryl]-morpholine hydrochloride.

EXAMPLE XXXIV

A mixture of 13.1 parts of diethyl (tetrahydro-3,3-diphenyl-2-furylidene) ammonium bromide, 5.9 parts of 4-(p-fluorophenyl) - 4-piperidinol, 8 parts of sodium carbonate, 0.2 part of potassium iodide and 200 parts of 4-methyl-2-pentanone is stirred and refluxed with water-separator for 5 hours. The reaction mixture is cooled and water (200 parts) is added. The organic layer is separated, washed with diluted sodium hydroxide solution, dried and filtered. The product is crystallized from the filtrate while stirring. It is filtered off and dried, yielding N,N-diethyl-4 - (p-fluorophenyl) - 4-hydroxy-α,α-diphenylpiperidine-1-butyramide; M.P. 135.4° C.

EXAMPLE XXXV (A) A mixture of 11.2 parts of diethyl (tetrahydro-3,3-diphenyl-2-furylidene) ammonium bromide, 6.2 parts of 4-(3,4-dichlorophenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and water is added. The organic layer is separated, washed with diluted sodium hydroxide solution, dried and concentrated to a volume of about 150 parts. The concentrate is acidified by the addition of an excess of 2-propanol, previously saturated with gaseous hydrogen chloride. The salt is crystallized while stirring. It is filtered off, dried and recrystallized from 240 parts of 2-propanol, yielding 4-(3,4 - dichlorophenyl)-N,N-diethyl-4-hydroxy-$\alpha,\alpha$-diphenyl-piperidine-1-butyramide hydrochloride; M.P. 245.3° C.

(B) By repeating the procedure of Example XXXV-A, except that an equivalent quantity of diethyl (tetrahydro-5-methyl-3,3-diphenyl-2-furylidene) ammonium bromide is initially employed, the corresponding product, 4-(3,4-dichlorophenyl)-N,N-diethyl - 4-hydroxy-$\gamma$-methyl-$\alpha,\alpha$-diphenylipiperidine-1-butyramide hydrochloride is obtained.

EXAMPLE XXXVI

A mixture of 13.1 parts of diethyl (tetrahydro-3,3-diphenyl-2-furylidene) ammonium bromide, 6.4 parts of 4-(p-chlorophenyl)-4-piperidinol, 8 parts of sodium carbonate, 0.2 part of potassium iodide and 200 parts of 4-methyl-2-pentanone is stirred and refluxed with water-separator for 3 hours. The reaction mixture is cooled and water is added. The organic layer is separated, dried and concentrated to a volume of about 175 parts. The turbid concentrate is filtered and the clear filtrate is acidified by the addition of an excess of 2-propanol previously saturated with gaseous hydrogen chloride. The crystallized salt is filtered off and dried in vacuo at 80° C., yielding 4 - (p-chlorophenyl)-N,N-diethyl-4-hydroxy-$\alpha,\alpha$-diphenyl-piperidine - 11-butyramide hydrochloride, hemi-isopropyl alcoholate; M.P. 236.6° C.

EXAMPLE XXXVII

A mixture of 13 parts of 1-(tetrahydro-3,3-diphenyl-2-furylidene)pyrrolidinium bromide, 5.3 parts of 4-phenyl-4-piperidinol, 8 parts of sodium carbonate, 0.2 part of potassium iodide and 200 parts of 4-methyl-2-pentanone is stirred and refluxed for 5 hours with water-separator. The reaction mixture is cooled and water is added. The organic layer is separated, washed with diluted sodium hydroxide solution, dried, filtered and while stirring the filtrate, the product is crystallized. It is filtered off and dried, yielding 1 - [4-(4-hydroxy-4-phenylpiperidino)-2,2-diphenylbutyryl]pyrrolidine; M.P. 187.5° C.

EXAMPLE XXXVIII

A mixture of 13 parts of 1-(tetrahydro-3,3-diphenyl-2-furylidene)pyrrolidinium bromide, 5.9 parts of 4-(p-fluorophenyl)-4-piperidinol, 8 parts of sodium carbonate, 0.2 part of potassium iodide and 200 parts of 4-methyl-2-pentanone is stirred and refluxed for 5 hours with water-separator. The reaction mixture is cooled, and 200 parts of water are added. The organic layer is separated, washed with diluted sodium hydroxide solution, dried, filtered and the product is crystallized from the filtrate. It is filtered off and dried, yielding about 9 parts of 1-{4-[4-(p-fluorophenyl) - 4 - hydroxypiperidino]-2,2-diphenylbutyryl}pyrrolidine; M.P. 192.3° C.

EXAMPLE XXXIX

A mixture of 13.6 parts of 4-(tetrahydro-3,3-diphenyl-2-furylidene)morpholinium bromide, 5.3 parts of 4-phenyl-4-piperidinol, 8 parts of sodium carbonate, 0.2 part of potassium iodide and 200 parts of 4-methyl-2-pentanone is stirred and refluxed for 3 hours with water-separator. The reaction mixture is cooled and 200 parts of water are added. The organic layer is separated, dried, filtered and evaporated. The oily residue is dissolved in 4-methyl-2-pentanone and the solution is acidified with an excess of 2-propanol previously saturated with gaseous hydrogen chloride. Upon the addition of diisopropylether, the salt is crystallized. It is filtered off, dried and recrystallized from 80 parts of 2-propanol (activated charcoal), yielding about 8 parts of crude 4-[4-(4-hydroxy-4-phenylpiperidino) - 2,2 - diphenylbutyryl]morpholine hydrochloride, hemi-isopropyl alcoholate. The latter fraction, together with the mother-liquors, is evaporated to dry and the oily residue is dissolved in water. The aqueous phase is alkalized with diluted sodium hydroxide solution and the free base is extracted with toluene. The extract is dried and evaporated. From the oily residue the hydrochloride salt is prepared, yielding 8 parts of pure 4-[4-(4-hydroxy-4-phenylpiperidino)-2,2-diphenylbutyryl]-morpholine hydrochloride, hemi-isopropyl alcoholate; M.P. 182.6° C.

EXAMPLE XL

A mixture of 13.1 parts of diethyl (tetrahydro-3,3,-diphenyl-2-furylidene)ammonium bromide, 5.3 parts of 4-phenyl-4-piperidinol, 8 parts of sodium carbonate, 0.2 part of potassium iodide and 200 parts of 4-methyl-2-pentanone, is stirred and refluxed for 3 hours with water-separator. The reaction mixture is cooled and 200 parts of water is added. The organic layer is separated, dried and concentrated to a volume of about 200 parts. The concentrate is filtered and then acidified with an excess of 2-propanol previously saturated with gaseous hydrogen chloride. The crystallized salt is filtered off, dried, to yield about 13 parts of crude N,N-diethyl-4-hydroxy-$\alpha,\alpha$,4-triphenylpiperidine-1-butyramide hydrochloride, hemi-isopropyl alcoholate. The latter fraction, together with the residue of the evaporated filtrate, is dissolved in water. This aqueous solution is alkalized with sodium hydroxide solution and the free base is extracted with toluene. The extract is dried and evaporated. From the oily free base, the hydrochloride salt is prepared again as described in former examples, to yield about 11.5 parts of N,N-diethyl-4-hydroxy-$\alpha,\alpha$,4-triphenylpiperidine-1-butyramide hydrochloride, hemi-isopropyl alcoholate; M.P. 248.3° C.

EXAMPLE XLI

A mixture of 13 parts of 1-(tetrahydro-3,3-diphenyl-2-furylidene)pyrrolidinium bromide, 5.75 parts of 4-p-tolyl-4-piperidinol, 8 parts of sodium carbonate, 0.2 part of potassium iodide and 200 parts of 4-methyl-2-pentanone is stirred and refluxed for 5 hours with water-separator. The reaction mixture is cooled and water is added. The organic layer is separated, washed with diluted sodium hydroxide solution, dried, and filtered. While stirring the filtrate at room temperature, the product is crystallized. It is filtered off and dried, yielding, after recrystallization from 80 parts of 4-methyl-2-pentanone (activated charcoal), about 5.5 parts of 1-[4-(4-hydroxy-4-p-tolylpiperidino)-2,2-diphenylbutyryl]pyrrolidine; M.P. 172.7° C.

EXAMPLE XLII

A mixture of 13.1 parts of diethyl (tetrahydro-3,3-diphenyl-2-furylidene)ammonium bromide, 7.4 parts of 4-(3-trifluoromethylphenyl)-4-piperidinol, 8 parts of sodium carbonate, 0.2 part of potassium iodide and 200 parts of 4-methyl-2-pentanone is stirred and refluxed for 3 hours with water-separator. The reaction mixture is cooled and water is added. The organic layer is separated, dried and concentrated to about 200 parts. The concentrate is filtered until clear and the filtrate is acidified with an excess of 2-propanol previously saturated with gaseous hydrogen chloride. The whole is evaporated and the residue is triturated in 4-methyl-2-pentanone, yielding N,N-diethyl - 4 - hydroxy - $\alpha,\alpha$ - diphenyl-4-(3-trifluoromethylphenyl)piperidine - 1 - butyramide hydrochloride; M.P. 222.2° C.

EXAMPLE XLIII

A mixture of 13 parts of 1-(tetrahydro-3,3-diphenyl-2-furylidene)pyrrolidinium bromide, 8.4 parts of 4-(4-chloro-3-trifluoromethylphenyl)-4-piperidinol, 8 parts of sodium carbonate, 0.5 part of potassium iodide and 200 parts of 4-methyl-2-pentanone is stirred and refluxed for 3 hours with water-separator. The reaction mixture is cooled and water is added. The organic layer is separated, washed with diluted sodium hydroxide solution, dried and evaporated. The residue is taken up in 2-propanol and acidified with an excess of 2-propanol previously saturated with gaseous hydrogen chloride. Upon stirring, the salt is crystallized. It is filtered off and recrystallized from 4-methyl-2-pentanone (activated charcoal), yielding 1-{4-[4-(4-chloro - 3 - trifluoromethylphenyl)-4-hydroxypiperidino] - 2,2 - diphenylbutyryl}pyrrolidine hydrochloride; M.P. 188.1° C.

EXAMPLE XLIV

A mixture of 10.4 parts of dimethyl (tetrahydro-3,3-diphenyl-2-furylidene)ammonium bromide, 6.2 parts of 4-(3,4-dichlorophenyl)-4-piperidinol, 8 parts of sodium carbonate, 0.5 part of potassium iodide and 200 parts of 4-methyl-2-pentanone is stirred and refluxed for 3 hours with water-separator. The reaction mixture is cooled and 200 parts of water is added. The organic layer is separated, washed with diluted sodium hydroxide solution, dried and evaporated to a volume of about 200 parts. The concentrate is acidified with an excess of 2-propanol previously saturated with gaseous hydrogen chloride. The salt crystallizes while stirring. It is filtered off and dried, yielding 4-(3,4-dichlorophenyl)-4-hydroxy - N,N - dimethyl-α,α-diphenylpiperidine - 1 - butyramide hydrochloride; M.P. 239.8° C.

EXAMPLE XLV

A mixture of 12.1 parts of dimethyl (tetrahydro-3,3-diphenyl-2-furylidene)ammonium bromide, 8.4 parts of 4-(4-chloro-3-trifluoromethylphenyl)-4-piperidinol, 8 parts of sodium carbonate, 0.4 part of potassium iodide and 200 parts of 4-methyl-2-pentanone is stirred and refluxed for 3 hours with water-separator. The reaction mixture is cooled and water is added. The organic layer is separated, washed with diluted sodium hydroxide solution, dried and concentrated to a volume of about 200 parts. The concentrate is acidified with an excess of 2-propanol previously saturated with gaseous hydrogen chloride. Upon stirring, the salt is crystallized. It is filtered off and dried, yielding 4-(4-chloro-3-trifluoromethylphenyl)-4-hydroxy - N,N - dimethyl - α,α - diphenylpiperidine-1-butyramide hydrochloride; M.P. 215.3° C.

EXAMPLE XLVI

A mixture of 21.3 parts of dimethyl (tetrahydro-5-methyl - 3,3 - diphenyl-2-furylidene)ammonium bromide, 5.9 parts of 4-(p-fluorophenyl)-4-piperidinol, 8 parts of sodium carbonate, 0.5 part of potassium iodide and 200 parts of 4-methyl-2-pentanone is stirred and refluxed for 32 hours with water-separator. The reaction mixture is cooled and 200 parts of water are added. The organic layer is separated, washed with diluted sodium hydroxide solution, dried and evaporated to a volume of about 150 parts. The concentrate is stirred at room temperature, whereupon the product is crystallized. It is filtered off and dried, yielding 4-(p-fluorophenyl)-4-hydroxy-N,N,γ-trimethyl - α,α - diphenylpiperidine - 1 - butyramide; M.P. 165.6° C.

EXAMPLE XLVII

A mixture of 16.3 parts of dimethyl (tetrahydro-5-methyl-3,3-diphenyl-2-furylidene) ammonium bromide, 5.3 parts of 4-phenyl-4-piperidinol, 8 parts of sodium carbonate, 0.5 part of potassium iodide and 200 parts of 4-methyl-2-pentanone is stirred and refluxed for 32 hours with water-separator. The reaction mixture is filtered hot and after cooling the filtrate to room temperature, the product is crystallized. It is filtered off and dried, yielding 4-hydroxy-N,N,γ-trimethyl-α,α,4-triphenylpiperidine-1-butyramide; M.P. 193.1° C.

EXAMPLE XLVIII

A mixture of 12.1 parts of dimethyl (tetrahydro-3,3-diphenyl-2-furylidene) ammonium bromide, 5.3 parts of 4-phenyl-4-piperidinol, 8 parts of sodium carbonate, 0.5 part of potassium iodide and 200 parts of 4-methyl-2-pentanone is stirred and refluxed for 3 hours with water-separator. The reaction mixture is cooled and 200 parts of water are added. The organic layer is separated, washed with diluted sodium hydroxide solution, dried, and concentrated to about 200 parts of its volume. The concentrate is acidified with an excess of 2-propanol previously saturated with gaseous hydrogen chloride. The precipitated acid salt is filtered off and the free base is liberated with alkali in the conventional manner. After crystallization from a mixture of diisopropylether and toluene, 4-hydroxy-N,N-dimethyl-α,α,4-triphenylpiperidine - 1 - butyramide; M.P. 130.3° C.

EXAMPLE XLIX

A mixture of 12.1 parts of dimethyl (tetrahydro-3,3-diphenyl-2-furylidene) ammonium bromide, 8.8 parts of 4-(p-bromophenyl) - 4 - piperidinol hydrochloride, 10.6 parts of sodium carbonate, 0.5 part of potassium iodide and 200 parts of 4-methyl-2-pentanone is stirred and refluxed for 14 hours with water-separator. The reaction mixture is cooled and water (200 parts) is added. The organic layer is separated, washed with diluted sodium hydroxide solution, dried, filtered and while stirring the filtrate, the product is crystallized. It is filtered off and recrystallized from 80 parts of 4-methyl-2-pentanone (activated charcoal), yielding 4-(p-bromophenyl)-4-hydroxy-N,N - dimethyl-α,α-diphenylpiperidine-1-butyramide hydrate; M.P. 123.7° C.

EXAMPLE L

A mixture of 13.1 parts of diethyl (tetrahydro-3,3-diphenyl-2-furylidene) ammonium bromide, 8.8 parts of 4-(p-bromophenyl) - 4 - piperidinol hydrochloride, 10.6 parts of sodium carbonate, 0.5 part of potassium iodide and 200 parts of 4-methyl-2-pentanone is stirred and refluxed for 14 hours with water-separator. The reaction mixture is cooled and water is added. The organic layer is separated, washed with diluted sodium hydroxide solution, filtered and on stirring the filtrate, the product is crystallized. It is filtered off and recrystallized from 80 parts of 4-methyl-2-pentanone (activated charcoal), yielding 4-(p-bromophenyl)-N,N-diethyl - 4 - hydroxy-α,α-diphenyl - piperidine - 1 - butyramide hemihydrate; M.P. 145.6° C.

EXAMPLE LI

A mixture of 11.1 parts of 1-(tetrahydro-3,3-diphenyl-2-furylidene) pyrrolidinium bromide, 6.2 parts of 4-(3,4-dichlorophenyl)-4-piperidinol, 8 parts of sodium carbonate, 0.5 part of potassium iodide and 200 parts of 4-methyl-2-pentanone, is stirred and refluxed for 3 hours with water-separator. The reaction mixture is cooled and water is added. The organic layer is separated, washed with diluted sodium hydroxide solution, dried and concentrated to a volume of about 200 parts. The concentrate is acidified with an excess of 2-propanol previously saturated with gaseous hydrogen chloride. The crystallized product is filtered off and recrystallized from 140 parts of boiling acetone, yielding 1-{4-[4-(3,4-dichlorophenyl)-4-hydroxypiperidino]-2,2 - diphenylbutyryl}pyrrolidine hydrochloride; M.P. 200.3° C.

EXAMPLE LII

A mixture of 5.3 parts of 4-phenyl-4-piperidinol, 8 parts of sodium carbonate, 0.5 part of potassium iodide and 200 parts of 4-methyl-2-pentanone is stirred and refluxed and the amount of separated water is distilled off azeotropically. The mixture is cooled to about 40° C., and there is added 12.8 parts of 1-(tetrahydro-5-methyl-3,3-diphenyl-2-furylidene)pyrrolidinium bromide. The whole is stirred and refluxed overnight. The second portion of 10 parts of 1-(tetrahydro-5-methyl-3,3-diphenyl-2-furylidene) pyrrolidinium bromide is added and stirring at reflux is continued for 12 hours. The reaction mixture is filtered hot and the filtrate is concentrated to a volume of about 180 parts. On stirring the concentrate, the product is crystallized. It is filtered off and dried, yielding 1-[4-(4-hydroxy - 4 - phenylpiperidino) - 2,2 - diphenylvaleryl]-pyrrolidine; M.P. 168° C.

EXAMPLE LIII

A mixture of 12.1 parts of dimethyl (tetrahydro-3,3-diphenyl-2-furylidene) ammonium bromide, 7.4 parts of 4-(3-trifluoromethylphenyl)-4-piperidinol, 8 parts of sodium carbonate, 0.5 part of potassium iodide and 200 parts of 4-methyl-2-pentanone is stirred and refluxed for 4 hours with water-separator. The reaction mixture is cooled and water is added. The organic layer is separated, washed with diluted sodium hydroxide solution, dried and concentrated to a volume of about 200 parts. The concentrate is acidified with an excess of 2-propanol previously saturated with gaseous hydrogen chloride. Upon stirring, the salt is crystallized. It is filtered off and dried, yielding 4 - hydroxy-N,N-dimethyl-$\alpha,\alpha$-diphenyl-4-(3-trifluoromethylphenyl)piperidine-1 - butyramide hydrochloride; M.P. 185.7° C.

EXAMPLE LIV

A mixture of 13 parts of 1-(tetrahydro-3,3-diphenyl-2-furylidene)pyrrolidinium bromide, 7.4 parts of 4-(3-trifluoromethylphenyl)-4-piperidinol, 8 parts of sodium carbonate, 0.5 part of potassium iodide and 200 parts of 4-methyl-2-pentanone is stirred and refluxed for 5 hours with water-separator. The reaction mixture is cooled and water is added. The organic layer is separated, washed with diluted sodium hydroxide solution, dried and evaporated. The oily residue is stirred in 320 parts of cold diisopropylether. The turbid solution is filtered over activated charcoal and the filtrate is acidified with an excess of 2-propanol previously saturated with gaseous hydrogen chloride. The precipitated salt is filtered off, dried and dissolved in 100 parts of 4-methyl-2-pentanone. The solution is filtered over activated charcoal and the product is crystallized again from the filtrate upon stirring. The solid is filtered off and dried at 70–80° C., yielding 1 - {4 - [4 - hydroxy - 4 - (3 - trifluoromethylphenyl)-piperidino]-2,2-diphenylbutyryl}pyrrolidine hydrochloride dihydrate; M.P. 117.5° C.

EXAMPLE LV

A mixture of 6.4 parts of 4-(p-chlorophenyl)-4-piperidinol, 8 parts of sodium carbonate, 0.5 part of potassium iodide and 200 parts of 4-methyl-2-pentaone is stirred and refluxed while water is distilled off azeotropically (about 30 minutes). The mixture is cooled to about 40° C. and there are added 12.8 parts of 1-(tetrahydro-5-methyl-3,3-diphenyl-2-furylidene) pyrrolidinium bromide. The whole is stirred and refluxed overnight. Then a second portion of 10 parts of 1-(tetrahydro-5-methyl-3,3-diphenyl-2-furylidene) pyrrolidinium bromide is added and stirring at reflux is continued for 12 hours. The reaction mixture is filtered hot, and on cooling the filtrate to room temperature, the product is crystallized. It is filtered off and dried, yielding 1-{4-[4-(p-chlorophenyl)-4-hydroxypiperidino]-2,2-diphenylvaleryl}pyrrolidine; M.P. 206.2° C.

EXAMPLE LVI

A mixture of 7.4 parts of 4-(3-trifluoromethylphenyl)-4-piperidinol, 10.6 parts of sodium carbonate, 0.5 part of potassium iodide and 200 parts of 4-methyl-2-pentanone is stirred and refluxed for 30 minutes with water-separator. The mixture is cooled to 40° C. and there are added 16.2 parts of dimethyl (tetrahydro-5-methyl-3,3-diphenyl-2-furylidene) ammonium bromide. The whole is stirred and refluxed overnight and the reaction mixture is filtered hot. The filtrate is concentrated to a volume of about 150 parts and on stirring the concentrate, the product is crystallized. It is filtered off and dried, yielding 4-hydroxy-N,N,$\gamma$-trimethyl - $\alpha,\alpha$ - diphenyl-4 - (3 - trifluoromethylphenyl)-piperidine-1-butyramide; M.P. 169.2° C.

EXAMPLE LVII

A mixture of 12.1 parts of dimethyl (tetrahydro-3,3-diphenyl-2-furylidene) ammonium bromide, 5.9 parts of 4-(p-fluorophenyl)-4-piperidinol, 8 parts of sodium carbonate, 0.5 part of potassium iodide and 200 parts of 4-methyl-2-pentanone is stirred and refluxed for 12 hours with water-separator. The reaction mixture is cooled and 200 parts of water is added. The organic layer is separated, washed with diluted sodium hydroxide solution, dried over magnesium sulfate, filtered over Hyflo and the filtrate is evaporated. The residue is dissolved in 2-propanol and to this solution is added an excess of 2-propanol previously saturated with gaseous hydrogen chloride. The crystallized salt is filtered off and dried, yielding 4-(p-fluorophenyl)-4-hydroxy-N,N-dimethyl-$\alpha,\alpha$ - diphenylpiperidine-1-butyramide hydrochloride hemi-isopropyl alcoholate; M..P. 233° C.

EXAMPLE LVIII

A mixture of 33.5 parts of 1-(tetrahydro-5-methyl-3,3-diphenyl-2-furylidene) pyrrolidinium bromide, 5.9 parts of 4-(p-fluorophenyl)-4-piperidinol, 10.6 parts of sodium carbonate, 0.5 part of potassium iodide and 200 parts of 4-methyl-2-pentanone is stirred and refluxed for 3 days. The reaction mixture is filtered hot and the filtrate is allowed to cool to room temperature while stirring. The precipitated product is filtered off and dried, yielding 1-{4-[4 - (p - fluorophenyl) - 4 - hydroxypiperidino] - 2,2 - diphenylvaleryl}-pyrrolidine; M.P. 186.3° C.

EXAMPLE LIX

A mixture of 33.5 parts of 1-(tetrahydro-5-methyl-3,3-diphenyl-2-furylidene) pyrrolidinium bromide, 7.4 parts of 4-(3-trifluoromethylphenyl)-4-piperidinol, 10.6 parts of sodium carbonate, 0.5 part of potassium iodide and 200 parts of 4-methyl-2-pentanone is stirred and refluxed for 90 hours with water-separator. The reaction mixture is filtered hot and the filtrate is cooled while stirring. Upon the addition of an excess of 2-propanol previously saturated with gaseous hydrogen chloride, the salt is precipitated. It is filtered off, and dried, yielding 1-{4-[4-hydroxy - 4 - (3 - trifluoromethylphenyl)piperidino] - 2,2-diphenylvaleryl} pyrrolidine hydrochloride dihydrate; M.P. 133.8° C.

EXAMPLE LX

A mixture of 8.4 parts of 4-(4-chloro-3-trifluoromethylphenyl)-4-piperidinol, 10.6 parts of sodium carbonate, 0.5 part of potassium iodide and 200 parts of 4,-methyl-2-pentanone is stirred and refluxed for 30 minutes with water-separator. The mixture is cooled to about 40° C. and there are added 16.2 parts of dimethyl (tetrahydro-5-methyl-3,3-diphenyl - 2 - furylidene)ammonium bromide. The whole is heated again to reflux and stirred and refluxed overnight. The reaction mixture is filtered hot and the filtrate is cooled while stirring. The crystallized product is filtered off and recrystallized from 100 parts of 4-methyl-2-pentanone (activated charcoal), yielding 8.1 parts of the crude free base. The latter fraction, together with the combined mother-liquors, is treated with sodium hydroxide solution and the product is crystallized again from 4-methyl-2-pentanone. The resulting product is dissolved in 4-methyl-2-pentanone and the solution is acidified with an excess of 2-propanol previously saturated with gaseous hydrogen chloride. The precipitated salt is filtered off and dried, yielding 5.5 parts of 4-(4-chloro-3-trifluoromethylphenyl) - 4 - hydroxy - N,N,$\gamma$ - trimethyl-$\alpha,\alpha$-diphenylpiperidine-1-butyramide hydrochloride; M.P. 207.5° C.

EXAMPLE LXI

A mixture of 6.4 parts of 4-(p-chlorophenyl)-4-piperidinol, 8 parts of sodium carbonate, 0.5 part of potassium iodide and 200 parts of 4-methyl-2-pentanone is stirred and refluxed for 30 minutes with water-separator. The mixture is cooled and there are added 13.3 parts of dipropyl (tetrahydro-3,3-diphenyl-2-furylidene) ammonium bromide. The whole is stirred again at reflux temperature for 4 hours. The reaction mixture is cooled and 200 parts of water is added. The organic layer is separated, dried, treated with activated charcoal, filtered over Hyflo and the filtrate is diluted with 320 parts of 4-methyl-2-pentanone. The organic solution is acidified with an excess of 2-propanol previously saturated with gaseous hydrogen chloride. The precipitated solid salt is filtered off and dried, yielding 4-(p-chlorophenyl)-4-hydroxy-α,α-diphenyl-N,N-dipropylpiperidine - 1 - butyramide hydrochloride; M.P. 255.4° C.

EXAMPLE LXII

A mixture of 17 parts of dibutyl (tetrahydro-3,3-diphenyl-2-furylidene) ammonium bromide, 7 parts of 4-(p-chlorophenyl)-4-piperidinol, 9 parts of sodium carbonate, 0.5 part of potassium iodide and 200 parts of 4-methyl-2-pentanone is stirred and refluxed for 3 hours with water-separator. The reaction mixture is cooled and water is added. The organic layer is separated, dried, filtered and evaporated. The oily residue is dissolved in diisopropylether and gaseous hydrogen chloride is introduced into the solution. The ether is decanted and the oily salt is stirred in water, toluene, diisopropyl-ether and 4-methyl-2-pentanone. The solid product is filtered off and dried, yielding N,N - dibutyl - 4 - (p-chlorophenyl)-4-hydroxy-α,α-diphenylpiperidine-1-butyramide hydrochloride; M.P. 129.3° C.

EXAMPLE LXIII (A) A mixture of 7 parts of 4-(p-chlorophenyl)-4-piperidinol, 9 parts of sodium carbonate, 0.5 part of potassium iodide and 200 parts of 4-methyl-2-pentanone is distilled azeotropically for 30 minutes with water-separator. The mixture is cooled and 14.6 parts of 2.6-dimethyl-4-(tetrahydro-3,3 - diphenyl - 2 - furylidene) morpholinium bromide are added. The whole is further stirred at reflux temperature for 2 hours. The reaction mixture is cooled and the layers are separated. The organic phase is dried and concentrated to about 200 parts. The residue is acidified with an excess of 2-propanol previously saturated with gaseous hydrogen chloride. Upon stirring for 30 minutes, the salt is crystallized. It is filtered off and dried overnight at 90–100° C., yielding 4-{4-[4-(p-chlorophenyl) - 4 - hydroxypiperidino] - 2,2 - diphenylbutyryl}-2,6-dimethylmorpholine hydrochloride; M.P. 240.9° C.

(B) By using equivalent amounts of the appropriate starting materials of Formula II and Formula III in the procedure of Example LXIII–A, the following compounds can be prepared:

4-[4-(4-hydroxy-4-phenylpiperidino)-2,2-diphenyl-valeryl]-2,6-dimethylmorpholine hydrochloride;
4-{4-[4-hydroxy-4-(p-methylphenyl)piperidino]-2,2-diphenylvaleryl}-2,6-dimethylmorpholine hydrochloride; and
4-{4-[4-hydroxy-4-(3-trifluoromethylphenyl)piperidino]-2,2-diphenylvaleryl}-2,6-dimethylmorpholino hydrochloride.

EXAMPLE LXIV

A mixture of 7.6 parts of dimethyl (tetrahydro-3,3-diphenyl-2-furylidene) ammonium bromide, 4.1 parts of 4-(2,4-xylyl)-4-piperidinol, 8 parts of sodium carbonate, 0.5 part of potassium iodide and 200 parts of 4-methyl-2-pentanone is stirred and refluxed for 24 hours with water-separator. The reaction mixture is cooled and water is added. The organic layer is separated, dried, filtered and evaporated. The residue is taken up in a mixture of acetone and diisopropylether (activated charcoal) and acidified with an excess of 2-propanol previously saturated with gaseous hydrogen chloride. The crystallized salt is filtered off and recrystallized from 4-methyl-2-pentanone, yielding 4-hydroxy-N,N-dimethyl-α,α-diphenyl - 4 - (2,4-xylyl)-piperidine - 1 - butyramide hydrochloride hydrate; M.P. 126.6° C.

EXAMPLE LXV (A) A mixture of 7 parts of 4-(p-chlorophenyl)-4-piperidinol, 9 parts of sodium carbonate, 0.5 part of potassium iodide and 200 parts of 4-methyl-2-pentanone is distilled azeotropically to dry. After cooling, there are added 14.4 parts of 4-methyl-1-(tetrahydro-3,3-diphenyl-2-furylidene)-piperidinium bromide and the whole is further stirred at reflux temperature for 3 hours. The reaction mixture is cooled and water is added. The organic layer is separated, dried, filtered and evaporated to a volume of about 200 parts. The residue is acidified with an excess of 2-propanol previously saturated with gaseous hydrogen chloride. The crystallized salt is filtered off and dried, yielding 1 - {4 - [4-(p-chlorophenyl) - 4 - hydroxypiperidino]-2,2-diphenylbutyryl} - 4 - methylpiperidine hydrochloride; M.P. 235.6° C.

(B) According to the process of Example LXV–A, the following compounds are prepared by using equivalent amounts of the appropriate starting materials of Formula II and Formula III:

1-{4-[4-hydroxy-4-(p-methylphenyl)piperidino]-2,2-diphenylvaleryl}-4-methylpiperidine hydrochloride;
1-{4-[4-hydroxy-4-(3-trifluoromethylphenyl)piperidino]2,2-diphenylvaleryl}-4-methylpiperidine hydrochloride; and
1-[4-(4-hydroxy-4-phenylpiperidino)-2,2-diphenylvaleryl]4-methylpiperidine hydrochloride.

EXAMPLE LXVI

A mixture of 7 parts of 4-(p-chlorophenyl)-4-piperidinol, 9 parts of sodium carbonate, 0.5 part of potassium iodide and 200 parts of 4-methyl-2-pentanone is distilled azeotropically to dry (water-separator). The mixture is cooled and there are added 13 parts of ethylmethyl (tetrahydro - 3,3 - diphenyl-2-furylidene) ammonium bromide. The whole is further stirred and refluxed for 2 hours. The reaction mixture is cooled and 200 parts of water is added. The organic layer is separated, dried, filtered and evaporated. The residue is dissolved in chloroform. The solution is washed with diluted sodium hydroxide solution, dried and evaporated. The oily free base is converted into its hydrochloride salt in the conventional manner in acetone and 2-propanol. The crystallized salt is filtered off and recrystallized from boiling acetone, yielding 4 - (p-chlorophenyl)-N-ethyl-4-hydroxy-N-methyl-α,α-diphenylpiperidine - 1 - butyramide hydrochloride; M.P. 215.8° C.

EXAMPLE LXVII

A mixture of 7 parts of 4-(p-chlorophenyl)-4-piperidinol, 9 parts of sodium carbonate, 0.1 part of potassium iodide and 200 parts of 4-methyl-2-pentanone is distilled azeotropically to dry (water-separator) for about 30 minutes. Then there are added 14.4 parts of 3-methyl-1-(tetrahydro-3,3-diphenyl - 2 - furylidene) piperidinium bromide, after cooling. Upon completion, the mixture is heated to reflux and stirring at reflux temperature overnight. The reaction mixture is cooled and 200 parts of water is added. The organic layer is separated, dried and evaporated to a volume of about 200 parts. The concentrate is acidified with an excess of 2-propanol previously saturated with gaseous hydrogen chloride. The crystallized salt is filtered off and dried in vacuo, yielding 1-{4-[4 - (p - chlorophenyl) - 4 - hydroxypiperidino]-2,2-diphenylbutyryl} - 3 - methylpiperidine hydrochloride; M.P. 215.8° C.

EXAMPLE LXVIII (A) A mixture of 6.4 parts of 4-(p-chlorophenyl)-4-piperidinol, 8 parts of sodium carbonate, 0.1 part of potassium iodide and 200 parts of 4-methyl-2-pentanone is distilled azeotropically to dry (water-separator) for about 30 minutes. After cooling, there are added 14 parts of benzylmethyl (tetrahydro-3,3-diphenyl-2-furylidene) ammonium bromide. Upon completion, the whole is stirred at reflux temperature for 1.5 hrs. The reaction mixture is cooled and water is added. The organic layer is separated, washed twice with water, dried and evaporated. The oily residue is converted into the hydrochloride salt in the conventional manner in 4-methyl-2-pentanone. The solvent is evaporated and the oily residue solidifies on triturating in diisopropyl-ether. The solid product is filtered off, dried, stirred once more in 4-methyl-2-pentanone and in toluene, filtered off and dried, yielding N-benzyl-4-(p-chlorophenyl) - 4 - hydroxy-N-methyl-α,α-diphenylpiperidine - 1 - butyramide hydrochloride; M.P. 225.4° C.

(B) Utilizing the procedure of Example LXVIII-A, except that equivalent quantities of the appropriate starting materials of Formulas II and III are employed, the following compounds can be prepared:

N-benzyl-4-hydroxy-N,γ-dimethyl-4-phenyl-α,α-diphenylpiperidine-1-butyramide hydrochloride;
N-benzyl-4-hydroxy-N,γ-dimethyl-4-(p-methylphenyl)-α,α-diphenylpiperidine-1-butyramide hydrochloride;
N-benzyl-4-hydroxy-4-(p-methoxyphenyl)-N,γ-dimethyl-α,α-diphenylpiperidine-1-butyramide hydrochloride;
N-benzyl-4-(3,4-dichlorophenyl)-α,α-bis(p-fluorophenyl)-4-hydroxy-N-methylpiperidine-1-butyramide hydrochloride;
N-benzyl-α-(p-fluorophenyl)-4-hydroxy-4-(p-methoxyphenyl)-N-methyl-α-phenylpiperidine-1-butyramide hydrochloride; and
N-benzyl-α,α-bis(p-fluorophenyl)-4-hydroxy-4-phenyl-N,γ-dimethylpiperidine-1-butyramide hydrochloride.

EXAMPLE LXIX

A mixture of 9 parts of α-(±)-4-(4-chloro-3-trifluoromethylphenyl)-3-methyl-4-piperidinol hydrochloride, 10.5 parts of sodium carbonate, 0.1 part of potassium iodide and 240 parts of 4-methyl-2-pentanone is distilled azeotropically to dry. After cooling, there are added 12 parts of dimethyl (tetrahydro-3,3-diphenyl-2-furylidene) ammonium bromide and the whole is stirred at reflux temperature overnight. The reaction mixture is cooled and 200 parts of water is added. The organic layer is separated, dried, filtered and evaporated. The oily free base is converted into its hydrochloride salt in 2-propanol and 4-methyl-2-pentanone. The solid salt is filtered off and crystallized from 2-propanol, yielding after drying, α-(±)-4-(4-chloro - 3 - trifluoromethylphenyl)-4-hydroxy-N,N,3-trimethyl-α,α-diphenylpiperidine - 1 - butyramide hydrochloride; M.P. 165.6° C.

EXAMPLE LXX

A mixture of 9.5 parts of dimethyl (tetrahydro-3,3-diphenyl-2-furylidene) ammonium bromide, 5.5 parts of 4-(3,4,5-trimethylphenyl)-4-piperidinol, 8.5 parts of sodium carbonate, 0.1 part of potassium iodide and 200 parts of 4-methyl-2-pentanone is stirred and refluxed for 24 hours with water-separator. The reaction mixture is cooled and water is added. The organic layer is separated, dried, filtered and evaporated. The oily residue is taken up in diisopropylether and acetone is added. The whole is acidified with an excess of 2-propanol previously saturated with gaseous hydrogen chloride. The crystallized salt is filtered off and recrystallized from 60 parts of 4-methyl-2-pentanone, yielding 4-hydroxy-N,N-dimethyl-α,α-diphenyl-4-(3,4,5-trimethylphenyl)-piperidine -1-butyramide hydrochloride. ½ $C_6H_{12}O$; M.P. 157.4° C.

EXAMPLE LXXI (A) A mixture of 6.4 parts of 4-(p-chlorophenyl)-4-piperidinol, 8 parts of sodium carbonate, 0.1 part of potassium iodide and 200 parts of 4-methyl-2-pentanone is distilled azeotropically to dry. Then there are added, after cooling, 13.1 parts of dially (tetrahydro-3,3-diphenyl-2-furylidene) ammonium bromide and the whole is stirred and refluxed for 3 hours. The reaction mixture is cooled and there is added ammonium hydroxide and water. The organic layer is separated, dried and concentrated to a volume of about 250 parts. The concentrate is acidified with an excess of 2-propanol previously saturated with gaseous hydrogen chloride while stirring. The precipitated salt is filtered off and recrystallized from 200 parts of ethanol (activated charcoal), yielding N,N-dially-4-(p-chlorophenyl) - 4 - hydroxy - α,α - diphenylpiperidine-1-butyramide hydrochloride; M.P. 258.3° C.

(B) Utilizing the preparative procedure of Example LXXI-A, but starting with an equivalent amount of an appropriate immonium ether precursor of Formula II, the following compounds can be obtained:

N,N-diallyl-4-(p-chlorophenyl)-α,α-bis(p-fluorophenyl)-4-hydroxypiperidine-1-butyramide hydrochloride; and
N,N-diallyl-4-(p-chlorophenyl)-α-(p-fluorophenyl)-4-hydroxy-α-phenylpiperidine-1-butyramide hydrochloride.

EXAMPLE LXXII

A mixture of 7 parts of 4 - (p - chlorophenyl) - 4-piperidinol, 9 parts of sodium carbonate, 0.1 part of potassium iodide and 200 parts of 4-methyl-2-pentanone is stirred and distilled azeotropically to dry. The mixture is cooled and there are added 13.5 parts of methylpropyl (tetrahydro - 3,3 - diphenyl-2-furylidene)ammonium bromide. The whole is stirred and refluxed for 3 hours. The reaction mixture is cooled and 200 parts of water is added. The organic layer is separated, dried, filtered and concentrated to a volume of about 200 parts. The concentrate is acidified with an excess of 2-propanol previously saturated with gaseous hydrogen chloride. The precipitated salt is filtered off and dried, yielding 4-(p-chlorophenyl)-4-hydroxy - N - methyl - α,α - diphenyl-N-propylpiperadine-1-butyramide hydrochloride; M.P. 190.5° C.

EXAMPLE LXXIII

A mixture of 8 parts of α-(±)-4-(3-trifluoromethylphenyl)-3-methyl-4-piperidinol, 10.5 parts of sodium carbonate, 0.1 part of potassium iodide and 240 parts of 4-methyl-2-pentanone is distilled azeotropically to dry. After cooling, there are added 13 parts of dimethyl (tetrahydro-3,3-diphenyl-2-furylidene) ammonium bromide and the whole is stirred and refluxed for 3 hours. The reaction mixture is cooled and 200 parts of water is added. The organic layer is separated, dried, filtered and evaporated. The residue is dissolved in 4-methyl-2-pentanone. The solution is treated with activated charcoal, filtered and the filtrate is acidified with an excess of 2-propanol previously saturated with gaseous hydrogen chloride. The crystallized salt is filtered off, dried and recrystallized from 4-methyl-2-pentanone, yielding α-(±)-4-hydroxy-N,N,3-trimethyl-α,α-diphenyl - 4 - (3-trifluoromethylphenyl)piperidine-1-butyramide hydrochloride; M.P. 218.8° C.

EXAMPLE LXXIV

A mixture of 8.2 parts of 4 - (p - chlorophenyl) - 4-piperidinol, 12.7 parts of sodium carbonate, 0.1 part of potassium iodide and 200 parts of 4-methyl-2-pentanone is distilled azeotropically to dry. After cooling, there are added 17.5 parts of methylisopropyl (tetrahydro-3,3-diphenyl-2-furylidene) ammonium bromide and the whole is stirred and refluxed for 3 hours. The reaction mixture is cooled and 200 parts of water is added. The organic layer is separated, dried, filtered and concentrated to a volume of about 250 parts. The concentrate is acidified with an excess of 2-propanol previously saturated with gaseous hydrogen chloride. The crystallized salt is filtered off and dried yielding 4-(p-chlorophenyl)-4-hydroxy-N-isopropyl - N-methlly-α,α-diphenylpiperidine-1-buytramide hydrochloride; M.P. 226° C.

EXAMPLE LXXV

A mixture of 6 parts of α-(±)-3-methyl-4-phenyl-4-piperidinol, 10.5 parts of sodium carbonate, 0.1 part of potassium iodide and 240 parts of 4-methyl-2-pentanone is distilled azeotropically to dry. After cooling, there are added 12 parts of dimethyl (tetrahydro-3,3-diphenyl-2-furylidene) ammonium bromide and the whole is stirred and refluxed for 3 hours. The reaction mixture is cooled and water is added. The organic layer is separated, dried and evaporated. The oily residue is dissolved in 4-methyl-2-pentanone and the solution is acidified with gaseous hydrogen chloride. The crystallized salt is filtered off and dried, yielding α-(±) - 4-hydroxy-N,N,3-trimethyl-α,α,4-triphenylpiperidine - 1 - butyramide hydrochloride; M.P. 226.2° C.

EXAMPLE LXXVI

A mixture of 6.7 parts of α-(±)-4-(p-chlorophenyl)-3-methyl-4-piperidinol, 10.6 parts of sodium carbonate, 0.5 part of potassium iodide and 240 parts of 4-methyl-2-pentanone is distilled azeotropically to dry. After cooling, there are added 12 parts of dimethyl (tetrahydro-3,3-diphenyl-2-furylidene) ammonium bromide and the whole is stirred and refluxed overnight. Water (200 parts) is added and the organic layer is separated, dried, filtered and evaporated. The residue is dissolved in diisopropylether. The solution is filtered and the filtrate is treated with activated charcoal. The latter is filtered off and the filtrate is evaporated. The residue is dissolved in 4-methyl-2-pentanone and the solution is acidified with an excess of 2-propanol previously saturated with gaseous hydrogen chloride. The crystallized salt is filtered off, recrystallized from 4-methyl-2-pentanone and dried, yielding 12 parts of crude α-(±) - 4 - (p-chlorophenyl)-4-hydroxy-N,N,3-trimethyl-α,α-diphenylpiperidine - 1 - butyramide hydrochloride. From this fraction, the free base is liberated with alkali in the conventional manner. After extraction with toluene, the latter is dried, filtered and evaporated. From the oily free base, the hydrochloride salt is again prepared by taking the oily base up in 2-propanol and then adding an excess of 2-propanol previously saturated with gaseous hydrogen chloride, yielding pure α-(±)-4-(p-chlorophenyl)-4-hydroxy,N,N,3-trimethyl - α,α - diphenylpiperidine-1-butyramide hydrochloride; M.P. 251.5° C.

EXAMPLE LXXVII

A mixture of 5.5 parts of 4-(2,5-dimethoxyphenyl)-4-piperidinol, 10.5 parts of sodium carbonate, 0.1 part of potassium iodide and 240 parts of 4-methyl-2-pentanone is distilled azeotropically to dry. After cooling, there are added 8 parts of dimethyl (tetrahydro-3,3-diphenyl-2-furylidene) ammonium bromide and the whole is stirred and refluxed for 2 hours. The reaction mixture is cooled and water is added. The organic layer is separated, dried, filtered and evaporated. The residue is dissolved in 4-methyl-2-pentanone and treated with activated charcoal. The latter is filtered off and the filtrate is acidified with an excess of concentrated nitric acid solution. The crystallized nitrate salt is filtered off and dried, yielding, after recrystallization from tetrahydrofuran 4-(2,5-dimethoxyphenyl) - 4 - hydroxy-N,N-dimethyl-α,α-diphenylpiperidine-1-butyramide nitrate; M.P. 180.5° C.

EXAMPLE LXXVIII

The processes described in Example VI or VII are followed to prepare those compounds of Formula II wherein —Alk— is —CH$_2$CH(CH$_3$)— and —N=Z is the desired ammonium function. For example, by starting with an equivalent amount of an appropriate amide of the formula:

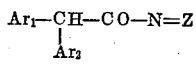

the following products can be obtained:

1-(tetrahydro-5-methyl-3,3-diphenyl-2-furylidene) piperidinium bromide;
4-methyl-1-(tetrahydro-5-methyl-3,3-diphenyl-2-furylidene) piperidinium bromide;
4-(tetrahydro-5-methyl-3,3-diphenyl-2-furylidene) morpholinium bromide;
diethyl (tetrahydro-5-methyl-3,3-diphenyl-2-furylidene) ammonium bromide;
benzylmethyl (tetrahydro-5-methyl-3,3-diphenyl-2-furylidene) ammonium bromide;
2,6-dimethyl-4-(tetrahydro-5-methyl-3,3-diphenyl-2-furylidene) morpholinium bromide.

EXAMPLE LXXIX

Utilizing the preparative method described in Example LXXIII, the following compounds can be prepared by starting with equivalent quantities of the appropriate ammonium ether of Formula II obtained from Example LXXVIII and the appropriate 4-Ar$_3$-3-methyl-4-hydroxypiperidine of Formula III:

α-(±)-N,N-diethyl-4-hydroxy-γ,3-dimethyl-α,α-diphenyl-4-(3-trifluoromethylphenyl)piperidine-1-butyramide hydrochloride;

α-(±)-N-benzyl-4-hydroxy-N,3,γ-trimethyl-α,α,4-triphenylpiperidine-1-butyramide hydrochloride;

α-(±)-4-{4-[4-hydroxy-3-methyl-4-(p-methylphenyl) piperidino]-2,2-diphenylvaleryl}morpholine hydrochloride;

α-(±)-4-{4-[4-hydroxy-4-(p-methoxyphenyl)-3-methylpiperidino]-2,2-diphenylvaleryl}piperidine hydrochloride;

α-(±)-4-{4-[4-(p-chlorophenyl)-4-hydroxy-3-methylpiperidino]-2,2-diphenylvaleryl}pyrrolidine hydrochloride;

α-(±)-4-[4-(4-hydroxy-3-methyl-4-phenylpiperidino)-2,2-diphenylvaleryl]-4-methylpiperidine hydrochloride; and α-(±)-4-{4-[4-(p-chlorophenyl)-4-hydroxy-3-methylpiperidino]-2,2-diphenylvaleryl}-2,6-dimethylmorpholine hydrochloride.

EXAMPLE LXXX

The procedure of Example LXXV is repeated using equivalent quantities of the appropriate Formula II and Formula III compounds as starting materials to yield the following products in the form of the hydrochloride salt:

α-(±)-N,N-diallyl-4-hydroxy-3-methyl-α,α,4-triphenylpiperidine-1-butyramide;

α-(±)-N-benzyl-4-hydroxy-N,3-dimethyl-α,α-diphenyl-4-(p-methylphenyl)piperidine-1-butyramide;

α-(±)-4-{4-[4-hydroxy-3-methyl-4-(p-methylphenyl) piperidino]-2,2-diphenylbutyryl}morpholine;

α-(±)-4-{4-[4-hydroxy-3-methyl-4-(p-methoxyphenyl) piperidino]-2,2-diphenylbutyryl}piperidine;

α-(±)-4-{4-[4-(p-chlorophenyl)-4-hydroxy-3-methylpiperidino]-2,2-diphenylbutyryl}pyrrolidine;

α-(±)-4-[4-(4-hydroxy-3-methyl-4-phenylpiperidino)-2,2-diphenylbutyryl]-4-methylpiperidine; and α-(±)-4-{4-[4-(p-chlorophenyl)-4-hydroxy-3-methylpiperidino]-2,2-diphenylbutyryl}-2,6-dimethylmorpholine.

EXAMPLE LXXXI 70 parts of 2-(p-fluorophenyl)acetonitrile are heated at 120° C. and there are added dropwise 83 parts of bromine and stirring is continued for 30 minutes. The resulting 2-bromo-2-(p-fluorophenyl)acetonitrile in the reaction mixture is added dropwise to a stirred mixture (room temperature) of 85 parts of aluminium chloride and 200 parts of fluorobenzene (exothermic reaction: temperature rises to 50° C.). After stirring for 30 minutes at 50° C., the reaction mixture is poured onto a mixture of crushed ice and 75 parts of hydrochloric acid solution. The product is extracted with toluene. The extract is dried and evaporated.

The residue is crystallized twice from 2-propanol, yielding 2,2-bis(p-fluorophenyl)acetonitrile; M.P. 63.5° C.

To a stirred mixture of 50 parts of 2,2-bis(p-fluorophenyl)acetonitrile, 66 parts of 1,2-dibromoethane and 4 parts of benzyltrimethylammonium chloride are added 100 parts of sodium hydroxide solution 50% while keeping the temperature below 50° C. Upon completion, stirring is continued first for 2 hours at 50° C. and further overnight at room temperature. The product is extracted with toluene. The extract is washed with water, dried and evaporated. The solid residue is crystallized from 2-propanol, yielding 4-bromo-2,2 - bis(p - fluorophenyl)butyronitrile; M.P. 125.5° C.

To 33 parts of glacial acetic acid are added successively: 50.5 parts of triethylamine (dropwise) and 110 parts of 4-bromo-2,2-bis(p-fluorophenyl)butyronitrile. The mixture is heated to reflux and stirred at reflux temperature for one hour. After cooling to about 90° C., there are added carefully 225 parts of hydrochloric acid and the whole is further stirred and refluxed for about 12 hours. The reaction mixture is cooled and extracted with chloroform. The organic phase is dried, filtered and evaporated. The residue is poured onto diisopropylether. The crystallized product is filtered off and dried, yielding 2,2-bis(p-fluorophenyl)-4-hydroxybutyric acid, γ-lactone; M.P. 82.3–91.9° C.

A mixture of 67 parts of 2,2-bis(p-fluorophenyl)-4-hydroxybutyric acid, γ-lactone and 260 parts of hydrobromic acid solution 48%/glacial acetic acid is stirred for 48 hours at room temperature. Water is added and the formed precipitate is filtered off. It is dissolved in diisopropylether and water is separated. The organic layer is dried, filtered and evaporated. The residue is triturated in petroleum ether, filtered off again and dried, yielding 4-bromo-2,2-bis (p-fluorophenyl)-butyric acid; M.P. 131.9–136.4° C.

A mixture of 53.3 parts of 4-bromo-2,2-bis(p-fluorophenyl)butyric acid, 36 parts of thionyl chloride and 225 parts of chloroform is stirred and refluxed for 4 hours. The reaction mixture is evaporated, yielding 4-bromo-2,2-bis(p-fluorophenyl)butyryl chloride as a residue which may be used without further purification as required in subsequent examples.

EXAMPLE LXXXII

The procedure of Example LXXXI is repeated, except that an equivalent amount of 2-phenyl-acetonitrile is substituted for the 2-(p-fluorophenyl)acetonitrile initially employed therein, to yield the corresponding final product, 4-bromo-2-(p-fluorophenyl)-2-phenylbutyryl chloride.

EXAMPLE LXXXIII (A) To a stirred and cooled (−5° C.) mixture of 20 parts of dimethylamine (40% in water), 150 parts of water and 19 parts of sodium carbonate is added dropwise a solution of 56 parts of 4-bromo-2,2-bis(p-fluorophenyl)butyryl chloride in 120 parts of toluene. Upon completion, stirring is continued for 2 hours. The whole is extracted with chloroform. The organic layer is separated, dried, filtered and evaporated. The residue is boiled in 4-methyl-2-pentanone and the product is filtered off while hot, yielding, after drying in vacuo, [3,3-bis(p-fluorophenyl)tetrahydro-2-furylidene] dimethylammonium bromide; M.P. 194.6–196.4° C.

(B) By starting with an equivalent quantity of 4-bromo-2-(p-fluorophenyl)-2-phenylbutyryl chloride in the procedure of Example LXXXIII–A, there is obtained dimethyl [3-(p-fluorophenyl) - 3 - phenyltetrahydro-2-furylidene] ammonium bromide.

EXAMPLE LXXXIV (A) By utilizing the procedures described in the examples presented heretofore, except that an equivalent amount of 4-bromo-2,2-bis(p-fluorophenyl)butyryl chloride and 4-bromo-2-(p-fluorophenyl) - 2 - phenylbutyryl chloride is used as the starting material to react with an appropriate amine of the formula HN=Z, the following respective products of Formula II, wherein —Alk— is —CH₂—CH₂—, are obtained:

1-[3,3-bis(p-fluorophenyl)tetrahydro-2-furylidene] pyrrolidinium bromide;
1-[3,3-bis(p-fluorophenyl)tetrahydro-2-furylidene] piperidinium bromide;
4-[3,3-bis(p-fluorophenyl)tetrahydro-2-furylidene] morpholinium bromide;
diethyl[3,3-bis(p-fluorophenyl)tetrahydro-2-furylidene] ammonium bromide;
benzyl[3,3-bis(p-fluorophenyl)tetrahydro-2-furylidene] methyl ammonium bromide;
4-[3,3-bis(p-fluorophenyl)tetrahydro-2-furylidene] 2,6-dimethylmorpholinium bromide;
1-[3,3-bis(p-fluorophenyl)tetrahydro-2-furylidene] 4-methylpiperidinium bromide;
diallyl[3,3-bis(p-fluorophenyl)tetrahydro-2-furylidene] ammonium bromide;
1-[3-(p-fluorophenyl)-3-phenyltetrahydro-2-furylidene] pyrrolidinium bromide;
1-[3-(p-fluorophenyl)-3-phenyltetrahydro-2-furylidene] piperidinium bromide;
4-[3-(p-fluorophenyl)-3-phenyltetrahydro-2-furylidene] morpholinium bromide;
benzyl[3-(p-fluorophenyl)-3-phenyltetrahydro-2-furylidene]methyl ammonium bromide.

(B) By substituting an equivalent amount of the foregoing Formula II immonium ether precursors in the procedures of the several preceding examples demonstrating the preparation of Formula I final products by interaction with a 4-Ar₃-3-R-4-piperidinol of Formula III, the corresponding Formula I compounds can be obtained wherein Ar₁ and/or Ar₂ are p-fluorophenyl and —Alk— is —CH₂CH₂—.

EXAMPLE LXXXV

This example demonstrates a method of preparing the compound of Formula X-a from the quaternary salt precursor of Formula II:

A solution of 7.5 parts of dimethyl(tetrahydro-3,3-diphenyl-2-furylidene)ammonium bromide in 50 parts of water is alkalized with 5 parts of sodium hydroxide solution 5 N and extracted three times with 40 parts of ether. The combined extracts are dried and evaporated (waterbath). Diisopropylether is added to the residue till all enters solution (water-bath). The solution is allowed to crystallize while standing at room temperature. The product is filtered off, washed with ether and dried in vacuo at 50° C., yielding 4-hydroxy-N,N-dimethyl - 2,2 - diphenylbutyramide; M.P. 131–132° C.

A mixture of 6 parts of 4-hydroxy-N,N-dimethyl-2,2-diphenylbutyramide, 3.2 parts of thionyl chloride and 37.5 parts of chloroform is stirred and refluxed for 2 hours. The reaction mixture is evaporated. The residue is cooled and dissolved in toluene. The solution is treated with activated charcoal, filtered and the filtrate is evaporated again. The residue is dissolved once more in diisopropylether, filtered and the filtrate is allowed to crystallize, yielding 4 - chloro-N,N-dimethyl-2,2-diphenylbutyramide; M.P. 136.3° C.

EXAMPLE LXXXVI

A mixture of 6.36 parts of 4-(p-chlorophenyl)-4-piperidinol, 8 parts of sodium carbonate, 0.1 part of potassium iodide and 200 parts of 4-methyl-2-pentanone is distilled azeotropically to dry. After cooling slightly there are added 13.39 parts of [3,3-bis(p-fluorophenyl)-tetrahydro-2-furylidene]dimethylammonium bromide and the whole is stirred at reflux for 3 hours. The reaction mixture is cooled and water is added. The organic layer is separated, dried, filtered and evaporated. The residue is converted into the hydrochloride salt in 2-propanol. The crystallized salt is filtered off and dried in vacuo at about 100° C. for 4 hours, yielding 4-(p-chlorophenyl)-α,α-bis(p-fluorophenyl) - 4 - hydroxy-N,N-dimethylpiperidine - 1 - butyramide hydrochloride hemiisopropyl alcoholate; M.P. 234.6° C.

EXAMPLE LXXXVII

A mixture of 1135 parts of dimethyl 3,3'-(benzylimino) dipropionate, 42.4 parts of sodium carbonate and 1800 parts of chloroform is stirred at room temperature and there are added dropwise 412 parts of methyl chloroformate over a period of about 30 minutes (exothermic reaction: cooling is necessary to keep the temperature below 45° C.). Upon completion, the whole is further stirred overnight at room temperature. Then 300 parts of water are added. The chloroform layer is separated, dried, filtered and evaporated yielding methyl N,N-bis[2-(methoxycarbonyl)ethyl]carbamate as a residue.

A vessel is charged with 250 parts of sodium methoxide solution 30% and 480 parts of xylene and methanol is distilled till a temperature of 75° C. is reached. Then there are added dropwise 250 parts of methyl N,N-bis[2-(methoxycarbonyl)ethyl]carbamate, and during this addition the methanol is distilled off. After the addition is complete, distillation of the methanol is continued till an internal temperature of about 125° C. is reached. The residue is stirred and refluxed for one hour. After cooling, there are added 85 parts of acetic acid in 100 parts of water (dropwise). The xylene phase is separated, washed with water, dried and evaporated. The oily residue is distilled, yielding dimethyl 4-oxo-1,3-piperidinedicarboxylate; B.P. 133–135° C. at 0.4 mm. pressure; $n_D^{20}$: 1.5015; $d_{20}^{20}$: 1.2648.

To a stirred mixture of 22 parts of sodium hydride 54.5% in 270 parts of anhydrous tetrahydrofuran is added dropwise a solution of 107.6 parts of dimethyl 4-oxo-1,3-piperidinedicarboxylate in 180 parts of anhydrous tetrahydrofuran (exothermic reaction: temperature rises from 20° C. to 48° C.). After the addition is complete, the whole is stirred for 2.5 hours at room temperature. Then there are added at once 142 parts of methyl iodide and the whole is heated to a temperature of about 60° C. After stirring for 20 hours at 60° C., the reaction mixture is cooled and filtered. The filter-cake is washed with tetrahydrofuran and the filtrate is evaporated. The residue is stirred in 1000 parts of toluene, filtered and the filtrate is evaporated. The oily residue is distilled, yielding dimethyl 3-methyl-4-oxo-1,3-piperidine-dicarboxylate; B.P. 122° C. at 0.4 mm. pressure.

740 parts of a solution of oxalic acid dihydrate in water (140 parts of oxalic acid dihydrate in 1000 parts of water) are stirred and refluxed for 24 hours together with 84.8 parts of dimethyl 3-methyl-4-oxo-1,3-piperidinedicarboxylate. Water is evaporated till dry. The precipitate is shaken thoroughly with toluene, filtered off and stirred in toluene. The toluene phase is filtered off, dried and evaporated. The oily residue is distilled, yielding methyl 3-methyl-4-oxo-1-piperidinecarboxylate; B.P. 136–137.5° C. at 10 mm. pressure.

EXAMPLE LXXXVIII

A solution of p-chlorophenyl magnesium bromide is prepared in the conventional manner, starting from 6 parts of magnesium, 48 parts of p-chlorobromobenzene and 225 parts of anhydrous tetrahydrofuran. To this solution is added dropwise a solution of 34.5 parts of methyl 3-methyl-4-oxo-1-piperidinecarboxylate in 55 parts of anhydrous tetrahydrofuran while stirring and refluxing. Upon completion, the heating source is removed and the whole is stirred for one hour. The reaction mixture is poured onto a mixture of 15 parts of acetic acid and crushed ice and the product is extracted with methylene chloride. The extract is dried, filtered and evaporated. The residue is crystallized from 2-propanol, yielding methyl 4-(p-chlorophenyl) - 4 - hydroxy-3-methyl-1-piperidinecarboxylate; M.P. 137° C.

A mixture of 32 parts of methyl 4-(p-chlorophenyl)-4-hydroxy-3-methyl-1-piperidinecarboxylate, 32 parts of potassium hydroxide and 600 parts of 2-propanol is stirred and refluxed for 48 hours. Then water is added and the reaction mixture is filtered. The solvent is evaporated and the aqueous phase is extracted with chloroform. The extract is dried, filtered and evaporated. The residue is crystallized several times from diisopropylether, yielding α,dl-4 - (p - chlorophenyl) - 3 - methyl - 4 - piperidinol; M.P. 128.5° C.

EXAMPLE LXXXIX

Starting from 5.84 parts of magnesium, 62.3 parts of 4-chloro-3-trifluoromethylphenyl bromide and 115 parts of tetrahydrofuran, the Grignard agent, 4-chloro-3-trifluoromethylphenyl magnesium bromide is formed in the conventional manner. To this stirring and hot (60° C.) solution is added dropwise a solution of 34.2 parts of methyl 3-methyl-4-oxo-1-piperidinecarboxylate in 135 parts of tetrahydrofuran. Upon completion, the reaction mixture is cooled to room temperature, while stirring. It is poured onto a mixture of crushed ice and glacial acetic acid. The aqueous phase is separated and extracted with chloroform. The combined organic layers are dried, filtered and evaporated. The oily residue is crystallized from diisopropylether, yielding methyl 4-(4-chloro-3-trifluoromethylphenyl) - 4 - hydroxy-3-methylpiperidine-1-carboxylate; M.P. 124.6–147.6° C.

A mixture of 444 parts of methyl 4-(4-chloro-3-trifluoromethylphenyl)-4-hydroxy-3-methylpiperidine - 1 - carboxylate, 819 parts of potassium hydroxide 85% and 2400 parts of 2-propanol is stirred and refluxed overnight. The reaction mixture is evaporated. The residue is taken up in water, whereupon two layers are separated. The aqueous phase is extracted with chloroform. The combined organic layers are washed with water, dried, filtered and evaporated. The residue is poured onto water and hydrochloric acid. The solid residue is dissolved in boiling water. The solution is alkalized with a 60% sodium hydroxide solution. On cooling, an oil is separated. The latter is crystallized from toluene, yielding 133 parts of the crude free base. After drying at 85° C. and crystallization from ethyl acetate, the fraction is dissolved in 4-methyl-2-pentanone. The solution is acidified with 2-propanol/HCl, whereupon the hydrochloride salt is precipitated. It is filtered off, dried and crystallized twice from 2-propanol, yielding α-(±)-4-(4-chloro-3-trifluoromethylphenyl) - 3 - methyl - 4-piperidinol hydrochloride; M.P. 260.6–262.5° C.

EXAMPLE XC

To a solution of 4-bromophenyl magnesium bromide, prepared in the usual manner, starting from 1.2 parts of magnesium and 11.8 parts of p-dibromobenzene in dry ether, is added a solution of 6 parts of 1-(ethoxycarbonyl)-4-oxo-piperidine in dry ether and the whole is stirred and refluxed for one hour. The resulting complex is cooled and poured onto a mixture of glacial acetic acid and crushed ice. The aqueous layer is separated and extracted once more with ether. The etheric phase is washed with water, dried, filtered and evaporated. The oily residue solidifies on scratching. The solid product is filtered off, stirred in a small quantity of toluene, filtered off again and dried, yielding 1-(ethoxycarbonyl)-4-(4-bromophenyl)-4 - hydroxypiperidine; which is used without further purification for the preparation of the next step.

A mixture of 4.65 parts of 1-(ethoxycarbonyl)-4-(4-bromophenyl)-4-hydroxypiperidine, 4.65 parts of potassium hydroxide, 45 parts of 2-propanol and 3 parts of water is stirred and refluxed overnight. After cooling the reaction mixture is poured onto 90 parts of water. Then there is added carefully an equimolar quantity of acetic acid 90%. When no more gas is evolved, the solvent is distilled off (maximum temperature 100° C.). The residue is extracted three times with chloroform. The combined extracts are dried and evaporated in vacuo. The solid residue is recrystallized from toluene, yielding 4-(4-bromophenyl)-4-hydroxypiperidine.

EXAMPLE XCI

A solution of 3,4,5-trimethylphenyl magnesium bromide is prepared in the usual manner, starting from 5,4 parts of magnesium and 56 parts of 3,4,5-trimethylbromobenzene in 225 parts of tetrahydrofuran. To this solution is added dropwise a solution of 38 parts of 1-(ethoxycarbonyl)-4-oxopiperidine in 225 parts of tetrahydrofuran at reflux temperature. After the addition is complete, the whole is further stirred and refluxed for 6 hours. The reaction mixture is added to a mixture of crushed ice and glacial acetic acid. The organic layer is separated, dried, filtered and evaporated. The oily residue is shaken for 15 minutes in 400 parts of petroleumether. The solvent is decanted and on standing and scratching, the oil solidifies. The solid is filtered off, stirred in diisopropylether, filtered off again and dried, yielding 1-(ethoxycarbonyl)-4-hydroxy-4-(3,4,5-trimethylphenyl)-piperidine; M.P. 137–139° C.

A mixture of 16.5 parts of 1-(ethoxycarbonyl)-4-hydroxy-4-(3,4,5-trimethylphenyl)piperidine, 10 parts of potassium hydroxide, 80 parts of 2-propanol and 3 parts of water is stirred and refluxed for 72 hours. Then there is added 50 parts of water with stirring. The solvent is evaporated. The residue is extracted with chloroform. The extract is dried, filtered and evaporated, yielding 4-hydroxy-4-(3,4,5-trimethylphenyl)piperidine; M.P. 170–174.5° C.

EXAMPLE XCII

The 4-Ar$_3$-3-R-4-piperidinols of Formula III and the processes of making same are generally known, e.g., see U.S. Pat. No. 3,438,991 and Belg. Pat. No. 690,751. As to those piperidinols of Formula III which may not have been specifically reported in the literature heretofore, such may be readily prepared by following the preparative procedures taught in said references or by following the preparative procedures of Examples LXXXVIII through XCI hereinabove using the appropriate starting materials. For example, by repeating the process of Example XC or XCI, except that an equivalent quantity of 3,5-dimethylbromobenzene is substituted for the bromobenzene derivative used therein, the corresponding 4-hydroxy-4-(3,5-dimethylphenyl)-piperidine is obtained. Likewise, the preparative procedure of Example LXXXVIII or LXXXIX may be followed, except that an equivalent quantity of 4-methyl- and 4-methoxybromobenzene is initially employed, to yield, as respective products: α-(±)-3-methyl-4-(p-methylphenyl)-4-piperidinol and α-(±)-4-(p-methoxyphenyl)-3-methyl-4-piperidinol.

EXAMPLE XCIII

A mixture of 7 parts of 4-(4-chloro-3-trifluoromethylphenyl)-4-piperidinol, 8 parts of sodium carbonate, 0.1 parts of potassium iodide and 200 parts of 4-methyl-2-pentanone is distilled azeotropically to dry. Then there are added 10 parts of ethylmethyl(tetrahydro-3,3-diphenyl-2-furylidene)ammonium bromide at reflux temperature and the whole is stirred at reflux for 2 hours. The reaction mixture is cooled and water is added. The organic layer is separated, dried, filtered and evaporated. The residue is taken up in tetrahydrofuran and acidified with concentrated nitric acid solution. The whole is evaporated and the residue is crystallized from 4-methyl-2-pentanone, yielding 4-(4-chloro-3-trifluoromethyl-phenyl)-N-ethyl-4-hydroxy - N - methyl - α,α - diphenyl-1-piperidine-butyramide nitrate, hemi-4-methyl-2-pentanone; M.P. 129.6° C.

EXAMPLE XCIV

To a stirred and cooled mixture of 100 parts of aqueous methyl amine (35%), 106 parts of sodium carbonate, 1000 parts of water and 800 parts of toluene is added dropwise (over a period of 30 minutes) to a solution of 337 parts of 4-bromo-2,2-diphenylbutyryl chloride in 200 parts of toluene, while keeping the temperature between 0° and 5° C. Upon completion, the cooling-bath is removed and stirring is continued for 2 hours. The precipitated product is filtered off and suspended in water. The solid is filtered off again and dissolved in chloroform. The solution is washed with water, dried and evaporated. The thick oily residue is poured onto warm 4-methyl-2-pentanone and while stirring the product is crystallized. It is filtered off and dried, yielding N-(tetrahydro-3,3-diphenyl-2-furylidene)methylamine hydrobromide; M.P. 154.4° C.

10 parts of N-(tetrahydro-3,3-diphenyl-2-furylidene)methylamine hydrobromide and 25 parts of sodium hydroxide solution are shaken and extracted with 80 parts toluene. The latter is dried and evaporated and the residue is crystallized from 4-methyl-2-pentanone, yielding N-(tetrahydro-3,3-diphenyl-2-furylidene)methylamine; M.P. 89.4° C.

Through a solution of 22.6 parts of N-(tetrahydro-3,3-diphenyl-2-furylidene)methylamine in 150 parts of chloroform gaseous hydrogen chloride is introduced over a period of 30 minutes. The whole is evaporated and the solid residue is crystallized from toluene, yielding 4-chloro-N-methyl-2,2-diphenylbutyramide, M.P. 152.3° C.

EXAMPLE XCV

The procedure of Example XCIV may be followed to prepare the butyramides of Formula X. For example, by utilizing an equivalent quantity of an appropriate 4-bromo-2,2-diarylbutyrl chloride and an equivalent quantity of an appropriate loweralkyl amine or aqueous ammonia as starting materials, the following products may be prepared:

4-chloro-N-methyl-2,2-bis(p-fluorophenyl)butyramide;
4-chloro-N-ethyl-2,2-diphenylbutyramide;
4-chloro-N-methyl-2-(p-fluorophenyl)-2-phenylbutyramide;
4-chloro-2,2-bis(p-fluorophenyl)butyramide; and
4-chloro-2-(p-fluorophenyl)-2-phenylbutyramide.

EXAMPLE XCVI

Gaseous hydrogen chloride is introduced for 30 minutes through a stirred and refluxing solution of 27 parts of 2-imino-3,3-diphenyl-tetrahydrofuran (described in J. Chem. Soc., 1949, 517) in 200 parts of 4-methyl-2-pentanone. The reaction mixture is evaporated and the residue is dissolved in toluene. The solution is filtered and the filtrate is evaporated again. The residue is crystallized from 4-methyl-2-pentanone, yielding 22 parts of 4-chloro-2,2-diphenylbutyramide; M.P. 183.2° C.

EXAMPLE XCVII

A mixture of 6.33 parts of 4-(p-chlorophenyl-4-piperidinol, 8 parts of sodium carbonate, 0.1 parts of potassium iodide and 240 parts of 4-methyl-2-pentanone is distilled azeotropically to dry. After cooling to 80° C., there are added 10.5 parts of 4-chloro-N-methyl-2,2-diphenylbutyramide and the whole is stirred and refluxed for 2 days with water-separator. Another 10.5 parts of 4-chloro-N-methyl-2,2-diphenylbutyramide are added and stirring at reflux temperature is continued overnight with water-separator. The reaction mixture is cooled to 80° C. and water is added. The organic layer is separated, dried filtered warm and after cooling the filtrate, the product is precipitated. It is filtered off and crystallized from 240 parts of 4-methyl-2-pentanone, yielding 5.5 parts of the less pure free base of 4-(p-chlorophenyl)-4-hydroxy-N-methyl - α,α - diphenyl - 1 - piperidinebutyramide hydrochloride; M.P. 216.2–220.8° C. The free base is converted into the hydrochloride salt in acetone, yielding 4.5 parts of 4-(p-chlorophenyl)-4-hydroxy-N-methyl-α,α-diphenyl-1-piperidinebutyramide hydrochloride; M.P. 236.9° C.

EXAMPLE XCVIII

A mixture of 10.5 parts of 4-chloro-N-methyl-2,2-diphenylbutyramide, 5.3 parts of 4-phenyl-4-piperidinol, 8 parts of sodium carbonate, 0.1 part of potassium iodide, and 240 parts of 4-methyl-2-pentanone is stirred and refluxed for 48 hours with water-separator. The reaction mixture is cooled to about 70–80° C. and water is added. The organic layer is separated, dried and evaporated. The oily residue is converted into the hydrochloride salt in toluene. The latter is decanted and upon the addition of acetone to the residue, while stirring, the solid salt is crystallized. It is filtered off, dried and recrystallized from a mixture of 2-propanol and acetone, yielding 5 parts of 4 - hydroxy - N - methyl - α,α,4 - triphenyl-1-piperidine-butyramide hydrochloride; M.P. 218.5° C.

EXAMPLE XCIX

To a solution of 10.5 parts of 4-(p-chlorophenyl)-4-piperidinol and 0.5 part of potassium iodide in 160 parts of 4-methyl-2-pentanone are added 6.85 parts of 4-chloro-2,2-diphenylbutyramide and the whole is stirred and refluxed overnight. The reaction mixture is filtered warm. The filtrate is washed with water, dried and evaporated. The oily residue is converted into the hydrochloride salt in acetone: no salt is crystallized. The whole is filtered and the filtrate is evaporated. The oily residue is crystallized from 4-methyl-2-pentanone. The solid product is boiled in a mixture of acetone and 4-methyl-2-pentanone. The undissolved part is filtered off and the filtrate is concentrated to a small and allowed to crystallize, yielding 1 part of 4 - (p-chlorophenyl) - 4-hydroxy-α,α-diphenyl-1-piperidinebutyramide hydrochloride; M.P. 236.6° C.

EXAMPLE C

The condensation procedures described in Examples XCVII–XCIX may be followed to prepare the compounds of Formula I-a. For example, by utilizing as starting materials an equivalent quantity of an appropriate 4-chloro-2, 2-diarylbutyramide of Formula X (see Examples XCIV–XCVI) and an equivalent quantity of a Formula III piperidinol, the following products may be obtained in the form of a hydrochloride salt:

4-hydroxy-4-(p-methoxyphenyl)-α,α-diphenyl-1-piperidine-butyramide;
4-hydroxy-4-(3,5-dimethylphenyl)-N-ethyl-α,α-diphenyl-1-piperidine-butyramide;
4-hydroxy-4-phenyl-N-methyl-α,α-bis(p-fluorophenyl)-1-piperidinebutyramide;
4-hydroxy-4-(3,4-dichlorophenyl)-α-(p-fluorophenyl)-α-phenyl-1-piperidinebutyramide;
4-hydroxy-4-(3-trifluoromethylphenyl)-N-ethyl-α,α-diphenyl-1-piperidinebutyramide;
4-hydroxy-3-methyl-4-phenyl-α,α-bis(p-fluorophenyl)-1-piperidinebutyramide; and
4-hydroxy-3-methyl-4-(4-chloro-3-trifluoromethylphenyl)-N-methyl-α,α-diphenyl-1-piperidine-butyramide.

The foregoing products may be converted to the corresponding base form by treatment with suitable alkali.

EXAMPLE CI

A. A mixture of 45 parts of 3-cyano-3,3-diphenyl-isobutyric acid [described in C.A. 55, 2565e (1961)], 48 parts of thionyl chloride and 300 parts of chloroform is stirred and refluxed for 2 hours. The mixture is evaporated and the residue (acid chloride derivative) is dissolved in 40 parts of dimethylformamide. The latter solution is added dropwise to 7.5 parts of sodium borohydride in 160 parts of dimethylformamide at a temperature between 20° and 25° C. Upon completion, the whole is stirred overnight at room temperature and further for one hour at 75° C. The reaction mixture is cooled and 15 parts of glacial acetic acid is added dropwise. The whole is poured onto a mixture of crushed ice and water and the product is extracted with diisopropyl-ether. The extract is dried and evaporated. The residue is dissolved in 200 parts of diisopropylether and the solution is saturated with gaseous hydrogen chloride while cooling. The solution is allowed to stand overnight at 0° C. The ether is decanted and the semi-solid residue is boiled in 4-methyl-2-pentanone. After cooling, the product is filtered off and dried, yielding tetrahydro-4-methyl-3,3-diphenyl - 2 - furanimine hydrochloride; M.P. 185.2–193.6° C.

To a stirred suspension of 5.75 parts of tetrahydro-4-methyl-3,3-diphenyl-2-furanimine hydrochloride in 45 parts of tetrahydrofuran are added portionwise 0.92 parts of lithium amide and the whole is further stirred at reflux temperature for 2 hours. The reaction mixture is cooled to room temperature and 14.2 parts of methyl iodide are added dropwise. After stirring and refluxing overnight, the reaction mixture is evaporated. The residue is stirred in water, whereupon an undissolved oil is separated. The aqueous phase is set aside and the oil is dissolved in 80 parts of 4-methyl-2-pentanone. The solution is stirred and refluxed overnight with 14.2 parts of methyl iodide. After cooling, the product is precipitated. It is filtered off and dried, yielding a first fraction of about 1.5 parts of (tetrahydro-4-methyl-3, 3-diphenyl-2-furylidene) dimethyl ammonium iodide; M.P. 180.1° C. The aqueous phase (which was set aside) is extracted with chloroform. The latter is dried and evaporated. The residue is boiled in 80 parts of 4-methyl-2-pentanone and after cooling, the product is precipitated. It is filtered off and dried, yielding a second fraction of about 1 part of (tetrahydro-4-methyl-3,3-diphenyl-2-furylidene) dimethyl ammonium iodide M.P. 184.2–188.7° C.

(B) By repeating the procedure of Example CI–A, except that an equivalent quantity each of ethyl iodide and n-propyl iodide are used in place of the methyl iodide used therein, the corresponding diethyl and dipropyl ammonium iodide products, respectively, are obtained.

EXAMPLE CII

A mixture of 2.1 parts of 4 - (p - chlorophenyl)-4-piperidinol, 2.67 parts of sodium carbonate and 80 parts of 4-methyl-2-pentanone is distilled azeotropically to dry with water-separator. After cooling to about 75° C., there are added 4.07 parts of (tetrahydro-4-methyl-3,3-diphenyl-2-furylidene)dimethyl ammonium iodide and the whole is stirred overnight at reflux temperature. The reaction mixture is cooled again to about 75° C. and water is added. The organic layer is separated, dried and evaporated. The residue is converted into the hydrochloride salt in acetone. The pure salt is filtered off and dried, yielding 4-(p-chlorophenyl)-4-hydroxy-N,N,β - trimethyl-α,α-diphenyl-1-piperidinebutyramide hydrochloride hemi-isopropylalcohol; M.P. 196° C.

EXAMPLE CIII

A mixture of 8 parts of (tetrahydro-4-methyl-3, 3-diphenyl-2-furylidene) dimethyl ammonium iodide, 5.6 parts of 4-(4-chloro-3-trifluoromethyl-phenyl)-4-piperidinol, 4.5 parts of sodium carbonate and 80 parts of 4-methyl-2-pentanone is stirred and refluxed overnight. The reaction mixture is poured onto water. The organic phase is separated, dried, filtered and evaporated. The residue is dissolved in diisopropylether and the solution is allowed to crystallize. The precipitated product is filtered off and dissolved in 4-methyl-2-pentanone. The solution is washed with diluted sodium hydroxide solution, dried and evaporated again. The residue is crystallized from a mixture of 2-propanol and diisopropylether, yielding 4-(4-chloro-3-trifluoromethylphenyl) - 4 - hydroxy-N,N,β-trimethyl-α,α-diphenyl-1-piperidine-butyramide; M.P. 200.2° C.

EXAMPLE CIV

A mixture of 8 parts of (tetrahydro-4-methyl-3,3-diphenyl-2-furylidene) dimethyl ammonium iodide, 5 parts of 4-(3-trifluoromethylphenyl)-4-piperidinol, 4.5 parts of sodium carbonate and 80 parts of 4-methyl-2-pentanone is stirred and refluxed overnight. The reaction mixture is poured onto water. The organic layer is separated, dried, filtered and evaporated. The residue is converted into the hydrochloride salt in 2-propanol and acetone. The crude salt is filtered off and recrystallized from a mixture of 2-propanol and acetone, yielding 4-hydroxy-N,N,β-trimethyl - α,α - diphenyl - 4 - (3-trifluoromethylphenyl)-1-piperidinebutyramide hydrochloride; M.P. 252.8° C.

EXAMPLE CV

The condensation procedure of Examples CII–CIV may be followed to prepare the compounds for Formula (I–b). For example, by utilizing as starting materials an equivalent quantity each of the di-lower-alkyl ammonium iodides obtained in Example CI with an equivalent quantity of a Formula III piperidinol, the corresponding N,N-di - lower - alkyl derivatives of 4-hydroxy-4-$Ar_3$-3-R-β-methyl-α,α-diphenyl-1-piperidinebutyramide are obtained as respective products.

We claim:

1. A 2,2-diaryl-4-piperidinobutyramide selected from the group of compounds represented by the formulas:

$$Ar_1-\underset{Ar_2}{\underset{|}{C}}-Alk-N\diamond\!\!\!\!\!\diamond\underset{Ar_3}{\overset{R}{\diamond}}OH \quad (I)$$

$$\overset{O}{\underset{}{\|}}\!\!C(N=Z)$$

$$Ar_1-\underset{Ar_2}{\underset{|}{C}}-CH_2CH_2-N\diamond\!\!\!\!\!\diamond\underset{Ar_3}{\overset{R}{\diamond}}OH \quad (I-a)$$

$$\overset{O}{\underset{}{\|}}\!\!C(N=Z_1)$$

and $$Ph-\underset{P}{\underset{|}{C}}-CH(CH_3)CH_2-N\diamond\!\!\!\!\!\diamond\underset{Ar_3}{\overset{R}{\diamond}}OH \quad (I-b)$$

$$\overset{O}{\underset{}{\|}}\!\!C(N=Z_2)$$

and the therapeutically active acid addition salts thereof wherein:

R is a member selected from the group consisting of hydrogen and methyl;

$Ar_1$ is a member selected from the group consisting of phenyl and halophenyl;

$Ar_2$ is a member selected from the group consisting of phenyl and halophenyl;

—Alk— is a member selected from the group consisting of —$CH_2CH_2$— and —$CH_2CH(CH_3)$—;

—N=Z is a member selected from the group consisting of $-N\square$, $-N\hexagon$, $-N\hexagon R_1$, $-N\hexagon O$, $-N\hexagon(R_1)(R_2)O$, $-N(R_3)(R_4)$ and $-N(CH_2CH=CH_2)_2$ in which $R_1$, $R_2$ and $R_4$ represent lower alkyl, and $R_3$ is a member selected from the group consisting of lower alkyl and benzyl;

—N=$Z_1$ is a member selected from the group consisting of —$NH_2$ and —NH(lower alkyl);

—N=$Z_2$ is —N(lower alkyl)$_2$; and $Ar_3$ is a member selected from the group consisting of phenyl and substituted phenyl, the latter being phenyl substituted with at least one member selected from the group consisting of lower alkyl, lower alkoxy, halo and trifluoromethyl;

provided that, when said —Alk— is

—$CH_2CH(CH_3)$— then said —N=Z is other than

—$N(CH_2CH=CH_2)_2$

2. A member selected from the group consisting of a chemical compound having the formula:

$$Ar_1-\underset{Ar_2}{\underset{|}{C}}-Alk-N\diamond\!\!\!\!\!\diamond\underset{Ar_3}{\overset{R}{\diamond}}OH$$

$$\overset{O}{\underset{}{\|}}\!\!C(N=Z)$$

and the therapeutically active acid addition salts thereof wherein:

R is a member selected from the group consisting of hydrogen and methyl;

$Ar_1$ is a member selected from the group consisting of phenyl and halophenyl;

$Ar_2$ is a member selected from the group consisting of phenyl and halophenyl;

—Alk— is a member selected from the group consisting of —$CH_2CH_2$— and —$CH_2CH(CH_3)$—;

—N=Z is a member selected from the group consisting of $-N\square$, $-N\hexagon$, $-N\hexagon R_1$, $-N\hexagon O$, $-N\hexagon(R_1)(R_2)O$, $-N(R_3)(R_4)$ and $-N(CH_2CH=CH_2)_2$ in which $R_1$, $R_2$ and $R_4$ represent lower alkyl, and $R_3$ is a member selected from the group consisting of lower alkyl and benzyl; and $Ar_3$ is a member selected from the group consisting of phenyl and substituted phenyl, the latter being phenyl substituted with at least one member selected from the group consisting of lower alkyl, lower alkoxy, halo and trifluoromethyl;

provided that, when said —Alk— is

—$CH_2CH(CH_3)$— then said —N=Z is other than

—$N(CH_2CH=CH_2)_2$

3. A member selected from the group consisting of a chemical compound having the formula:

$$Ar_1-\underset{Ar_2}{\underset{|}{C}}-CH_2CH_2-N\diamond\!\!\!\!\!\diamond\underset{Ar_3}{\overset{R}{\diamond}}OH \quad (I-a)$$

$$\overset{O}{\underset{}{\|}}\!\!C(N=Z_1)$$

and the therapeutically active acid addition salts thereof wherein:

R is a member selected from the group consisting of hydrogen and methyl;

$Ar_1$ is a member selected from the group consisting of phenyl and halophenyl;

$Ar_2$ is a member selected from the group consisting of phenyl and halophenyl;

—N=$Z_1$ is a member selected from the group consisting of —$NH_2$ and —NH(lower alkyl); and $Ar_3$ is a member selected from the group consisting of phenyl and substituted phenyl, the latter being phenyl substituted with at least one member selected from the group consisting of lower alkyl, lower alkoxy, halo and trifluoromethyl.

4. A member selected from the group consisting of a chemical compound having the formula:

$$Ph-\underset{Ph}{\underset{|}{C}}-CH(CH_3)CH_2-N\diamond\!\!\!\!\!\diamond\underset{Ar_3}{\overset{R}{\diamond}}OH \quad (I-b)$$

$$\overset{O}{\underset{}{\|}}\!\!C(N=Z_2)$$

and the therapeutically active acid addition salts thereof wherein:

R is a member selected from the group consisting of hydrogen and methyl;

—N=Z₂ is —N(loweralkyl)₂; and

Ar₃ is a member selected from the group consisting of phenyl and substituted phenyl, the latter being phenyl substituted with at least one member selected from the group consisting of lower alkyl, lower alkoxy, halo and trifluoromethyl.

5. A member selected from the group consisting of a 2,2 - diphenyl - 4 - (4' - aryl - 4' - hydroxypiperidino) butyramide having the formula:

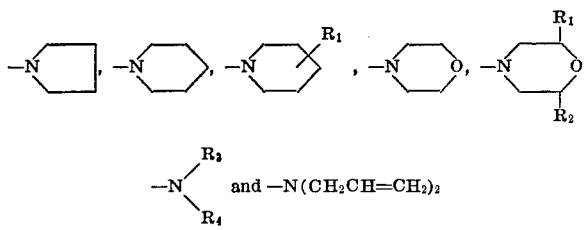

and the therapeutically active acid addition salts thereof wherein:

—N=Z is a member selected from the group consisting of

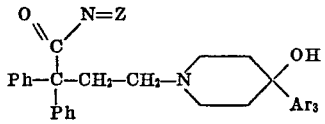

in which R₁, R₂ and R₄ represent lower alkyl, and R₃ is a member selected from the group consisting of lower alkyl and benzyl; and Ar₃ is a member selected from the group consisting of phenyl and substituted phenyl, the latter being phenyl substituted with at least one member selected from the group consisting of lower alkyl, lower alkoxy, halo and trifluoromethyl.

6. A member selected from the group consisting of a 2,2 - diphenyl - 4 - (4' - aryl - 4' - hydroxypiperidino) valeramide having the formula:

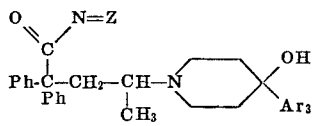

and therapeutically active acid addition salts thereof wherein:

—N=Z is a member selected from the group consisting of

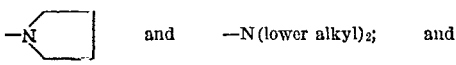

Ar₃ is a member selected from the group consisting of phenyl and substituted phenyl, the latter being phenyl substituted with at least one member selected from the group consisting of lower alkyl, lower alkoxy, halo and trifluoromethyl.

7. A chemical compound selected from the group consisting of 4-(p-chlorophenyl) - 4 - hydroxy-N,N-dimethyl- α,α-diphenylpiperidine-1-butyramide and the therapeutically active acid addition salts thereof.

8. A chemical compound selected from the group consisting of 1-[4 - (4 - hydroxy - 4 - phenylpiperidino)-2,2- diphenylbutyryl]piperidine and the therapeutically active acid addition salts thereof.

9. A chemical compound selected from the group consisting of 4-{4-[4-hydroxy - 4 - (3-trifluoromethylphenyl) piperidino] - 2,2 - diphenylbutyryl}morpholine and the therapeutically active acid addition salts thereof.

10. A chemical compound selected from the group consisting of 1-{4-[4-hydroxy - 4 - (3-trifluoromethylphenyl) piperidino] - 2,2 - diphenylbutyl}piperidine and the therapeutically active acid addition salts thereof.

11. A chemical compound selected from the group consisting of 4-(p chlorophenyl) - 4 - hydroxy-N,N,γ-trimethyl-α,α-diphenylpiperidine - 1 - butyramide and the therapeutically active acid addition salts thereof.

12. A chemical compound selected from the group consisting of 4-(3,4 - dichlorophenyl)-N,N-diethyl - 4 - hydroxy-α,α-diphenylpiperidine - 1 - butyramide and the therapeutically active acid addition salts thereof.

13. A chemical compound selected from the group consisting of 4 - (3,4 - dichlorophenyl) - 4 - hydroxy-N,N-dimethyl - α,α - diphenylpiperidine - 1 - butyramide and the therapeutically active acid addition salts thereof.

14. A chemical compound selected from the group consisting of 4 - (4 - chloro - 3 - trifluoromethylphenyl)-4-hydroxy - N,N - dimethyl - α,α - diphenylpiperidine-1-butyramide and the therapeutically active acid addition salts thereof.

15. A chemical compound selected from the group consisting of 4-(p-fluorophenyl) - 4 - hydroxy-N,N,γ-trimethyl - α,α - diphenylpiperidine - 1 - butyramide and the therapeutically active acid addition salts thereof.

16. A chemical compound selected from the group consisting of 4-(p-bromophenyl) - 4 - hydroxy-N,N-dimethyl - α,α - diphenylpiperidine - 1 - butyramide and the therapeutically active acid addition salts thereof.

17. A chemical compound selected from the group consisting of 1-{4-[4-(3,4 - dichlorophenyl) - 4 - hydroxypiperidino] - 2,2 - diphenylbutyryl}-pyrrolidine and the therapeutically active acid addition salts thereof.

18. A chemical compound selected from the group consisting of 4 - (p-chlorophenyl)-N-ethyl - 4 - hydroxy-N-methyl - α,α - diphenylpiperidine - 1 - butyramide and the therapeutically active acid addition salts thereof.

No references cited.

ALEX MAZEL, Primary Examiner

J. TOVAR, Assistant Examiner

U.S. Cl. X.R.

260—247.2, 247.5 R, 293.64, 293.71, 293.73, 293.76, 247.7 G, 320.5 D, 293.67; 424—248